United States Patent
Munson et al.

[15] 3,657,926
[45] Apr. 25, 1972

[54] METHOD AND APPARATUS FOR MEASURING PHYSICAL PHENOMENA

[72] Inventors: Robert V. Munson; Richard E. Bensmiller, both of San Antonio, Tex.

[73] Assignee: Thayer Corporation, San Antonio, Tex.

[22] Filed: Apr. 2, 1970

[21] Appl. No.: 25,162

Related U.S. Application Data

[63] Continuation-in-part of Ser. No. 868,838, Oct. 23, 1969, abandoned.

[52] U.S. Cl. ............................................73/404, 73/398 C
[51] Int. Cl. ..................................................G01l 7/22
[58] Field of Search ............................73/420, 4, 404, 401; 235/151.3, 151.34

[56] References Cited

UNITED STATES PATENTS

| | | | |
|---|---|---|---|
| 2,203,523 | 6/1940 | Cunningham | 73/404 X |
| 2,620,666 | 12/1952 | Schmidt | 73/404 |
| 2,818,726 | 1/1958 | Amonette et al. | 73/4 |

Primary Examiner—Donald O. Woodiel
Attorney—Giles C. Clegg, Jr.

[57] ABSTRACT

A closed loop measuring system includes a digital computer, a measurement device, actuator means associated with the measurement device, and controlled by the computer for establishing known and unknown conditions of a physical phenomena such as pressure, torque, or temperature in the measurement device, and the sensors associated with the measurement device responsive to the conditions established therein for producing relative data values which are stored in the computer memory. The computer controls the establishment of the known and unknown conditions in the measurement apparatus and the storing of the relative data values, and calculates the unknown conditions from the stored relative data values and the stored values for the known conditions. Measurement apparatus for use in such systems, includes a water manometer for measuring gas pressure, a mercury manometer for measuring gas pressure, a torque transducer for measuring torque loads, and a temperature transducer for measuring temperature.

35 Claims, 28 Drawing Figures

INVENTORS
ROBERT V. MUNSON
RICHARD E. BENSMILLER

ATTORNEY

INVENTORS
ROBERT V. MUNSON
RICHARD E. BENSMILLER

ATTORNEYS

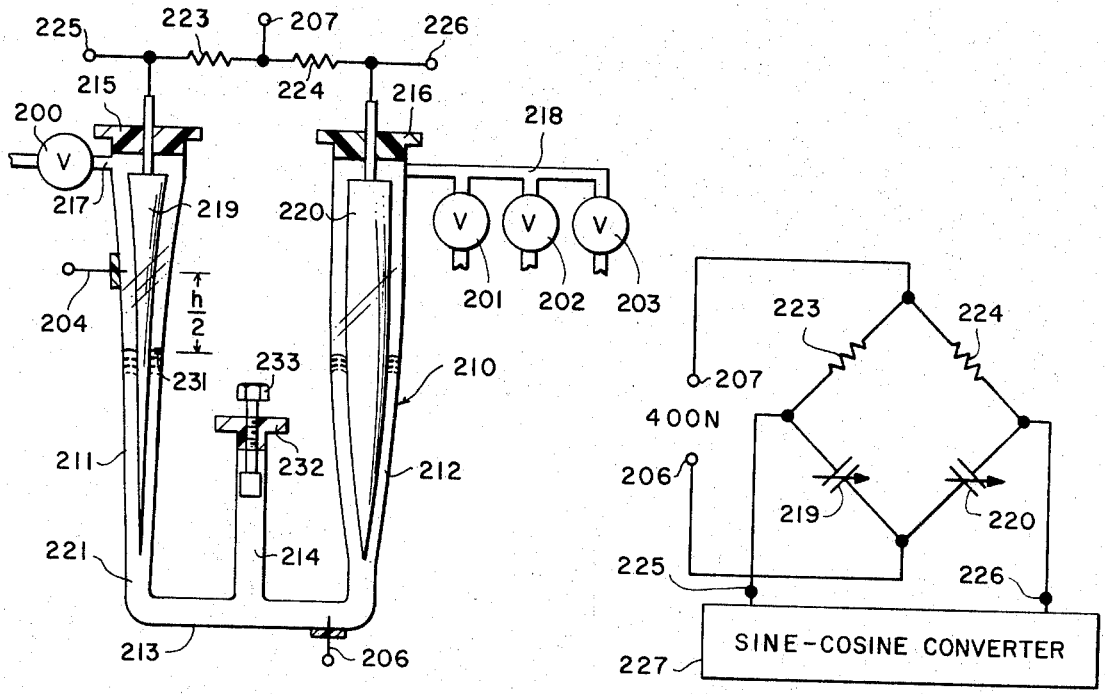
FIG. 12
FIG. 13
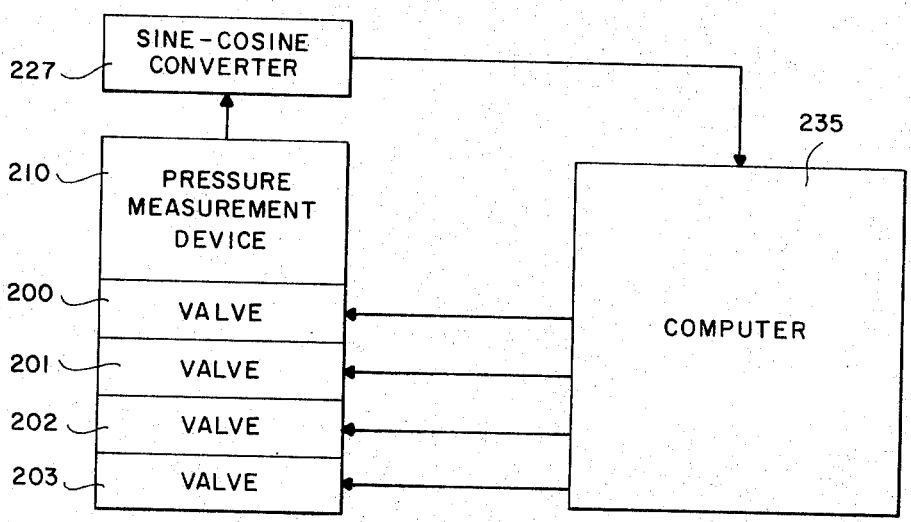
FIG. 14
INVENTORS
ROBERT V. MUNSON
RICHARD E. BENSMILLER
ATTORNEY

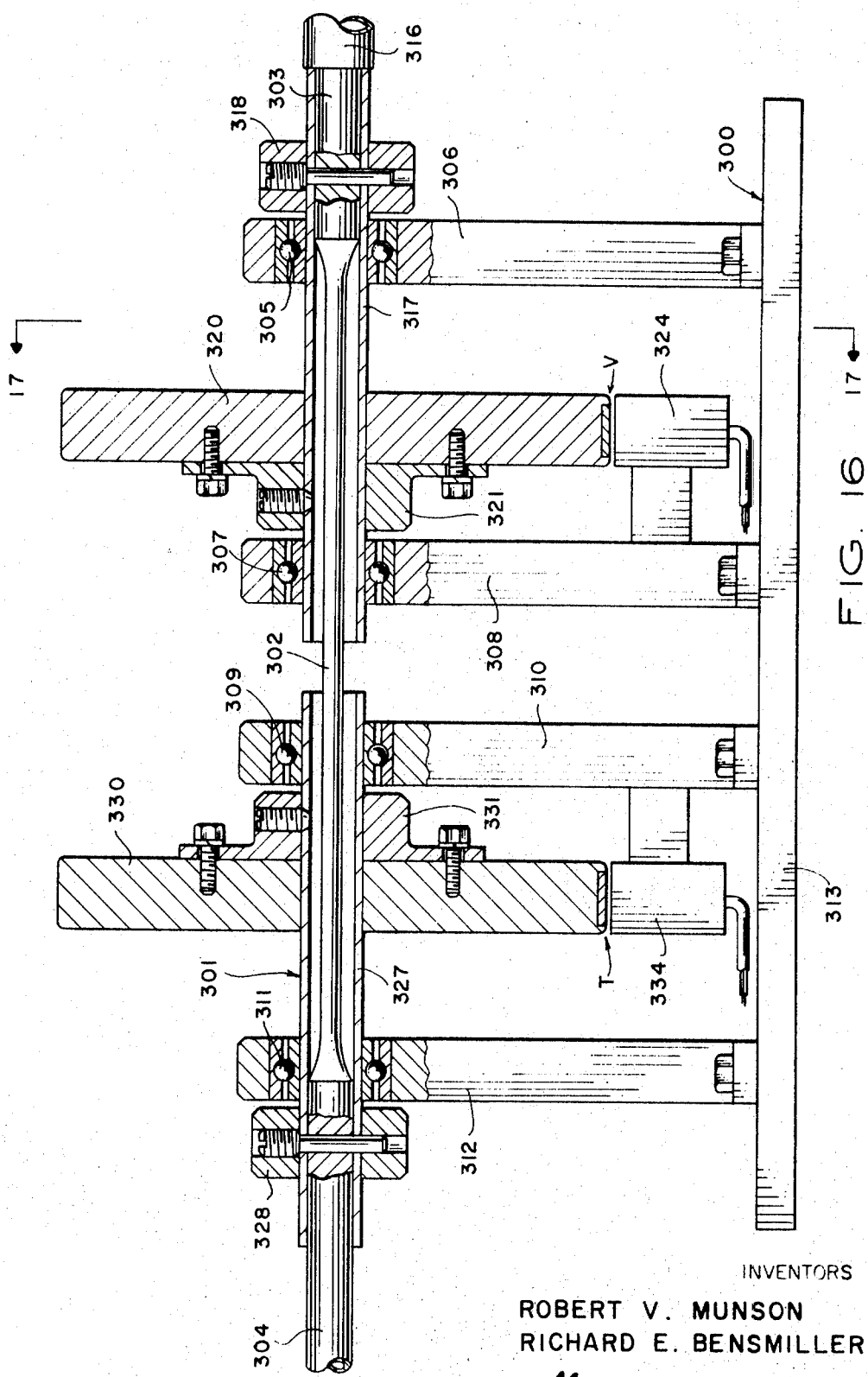

INVENTORS
ROBERT V. MUNSON
RICHARD E. BENSMILLER

ATTORNEY

INVENTORS
ROBERT V. MUNSON
RICHARD E. BENSMILLER

ATTORNEY

INVENTORS
ROBERT V. MUNSON
RICHARD E. BENSMILLER

ATTORNEY

METHOD AND APPARATUS FOR MEASURING PHYSICAL PHENOMENA

REFERENCE TO RELATED APPLICATION

This application is a continuation-in-part of application Ser. No. 868,838, filed Oct. 23, 1969 now abandoned.

BACKGROUND OF THE INVENTION

This invention relates to measuring physical phenomena under the control of a computer wherein the computer controls the establishment of known and unknown conditions in a measurement device, receives from the measuring device relative data values corresponding to such known and unknown conditions, and calculates the measured values of the unknown conditions.

In applications where it is important that measurements of pressure, temperature and torque, for example, be quite accurate, it is necessary to frequently calibrate the measuring instruments or devices against known standards. Frequently the techniques for calibrating such measurement instruments are time consuming and, therefore, expensive; additionally the calibration techniques may require interruption of process streams or the operation of apparatus.

The calibration of gas pressure measuring instruments, for example, is usually done with gage blocks, thermometers, and the local value of gravity; these procedures being involved and time consuming. The calibration of pressure measuring instruments which are on-line in a processing stream may present particular problems since it may be necessary either to remove the instrument from the line or to connect a primary standard in the line. A particular problem would exist in the on-line situation where the pressure measuring instrument is continuously monitored to assure proper process control, or even more particularly where the value of the continuously measured or monitored pressure is employed to produce a control signal which varies or controls a further process function in response to pressure variations. In such a situation where the pressure control process function is quite critical, the suspicion of inaccuracy in a pressure measuring instrument may prompt the decision to shut down the process stream.

The measurement of process temperatures is usually accomplished with thermocouples, with the thermocouples being calibrated by charting the thermocouple outputs for a known temperature as measured by a thermometer for example. The disadvantages of thermocouple measurement devices include inaccuracies due to corrosion, and difficulty of calibration due to inaccessability of the thermocouples in process equipment. Another disadvantage, in regard to calibration, is that it may be necessary to remove the thermocouples from the process location due to the fact that the process stream will not withstand the calibration temperature involved. Another method of calibrating temperature measuring instruments in process situation is to place a primary standard on-line and compare the output of the on-line measuring device with the primary standard. This procedure is time consuming and may involve shut down of the process stream.

The measuring or monitoring of torque loads come either in a test situation or under operation conditions usually performed through the use of a torque shaft with strain gages attached. The procedure is involved and time consuming and particularly in that after the strain gages are appropriately affixed to the torque shaft, the torque shaft strain gage instrument must be calibrated by charting the output of the instrument known as torque loads as measured with a dynamometer for example.

It would be very desirable then to have available instruments for measuring physical phenomena which may be calibrated very accurately and very quickly, and particularly against known conditions which are inherent conditions measured by the apparatus and which exist at the time of taking the measurements of the unknown conditions. This invention is concerned with a method and apparatus for taking measurements of pressure, temperature and torque and where the measuring instrument may be readily recalibrated if it is suspected that the extent calibration is no longer valid.

SUMMARY OF THE INVENTION

An object of this invention is to provide a method for producing data for calculating the value of an unknown condition of a physical phenomena, including data based on the known conditions, wherein the calculated value is calibrated against the known conditions.

Another object of this invention is to provide a method for calculating values of unknown conditions of a physical phenomena by establishing known and unknown conditions in a measuring transducer responsive to the phenomena and for calculating the value of the unknown condition from the measured values of the known conditions and the outputs of the transducer measuring instrument.

Another object of this invention is to provide a method and apparatus for measuring a physical phenomenon, wherein known conditions of the phenomenon to be measured are employed as constants to calibrate a measuring instrument and also to calculate the values of the unknown conditions of the phenomenon established by the measuring instrument.

Another object of this invention is to provide a method and apparatus for measuring a physical phenomenon, providing for self-calibration of the measuring instrument with minimal interruption of the phenomenon to be measured which are established in the measuring instrument.

Another object of this invention is to provide a method and apparatus for measuring a physical phenomenon providing self-calibration of the measuring instrument with minimal interruption of the measuring function.

A further object of this invention is to provide a method and apparatus for providing data corresponding to known and unknown conditions of a physical phenomenon from which the value of an unknown condition of the phenomenon can be mathematically determined.

Broadly, a method according to the invention includes establishing at least two known conditions of a phenomenon to be measured in apparatus for measuring that phenomenon, establishing at least one unknown condition of that phenomenon in the apparatus which is the condition to be measured, and storing relative data values in a memory for each of these established conditions, the relative data value being one coordinate of different points on the curve and the measured values of the known conditions being the other coordinates of respective points whereby the value of the unknown condition may be mathematically calculated using curve fitting techniques. The method further contemplates providing a computer including a memory, a control means, and a processing means, whereby the computer controls the establishment of the several conditions in the measurement apparatus, accepts and stores the relative data values corresponding to the established conditions, and calculates the value of the unknown condition. The measuring process, then, involves self-calibration of the measuring instrument against the known conditions.

Apparatus according to the invention includes a measuring device for measuring a certain physical phenomenon, the device including actuators for establishing different conditions of the phenomenon therein, and including a sensor for producing output data values corresponding to the established condition therein, the apparatus being adapted for a closed loop system with a computer having a memory, control means, and processing means whereby the computer controls the measuring instrument through the actuators, receives and stores information from the sensors, and calculates the value of the unknown condition.

The novel features of the invention, as well as additional objects and advantages thereof, will be understood more fully from the following description when read in connection with the accompanying drawings.

DRAWINGS

FIG. 12 is a diagrammatic illustration of a mercury manometer pressure measuring device for use in a computer controlled system as depicted in FIG. 1;

FIG. 13 is a schematic circuit diagram including certain circuit components illustrated in FIG. 12;

FIG. 14 is a functional block diagram of a computer controlled system including the apparatus of FIGS. 12 and 13;

FIG. 16 is a diagrammatic cross-sectional view of a torque transducer for measuring torque in a computer control system as depicted in FIG. 1;

Figure 1:
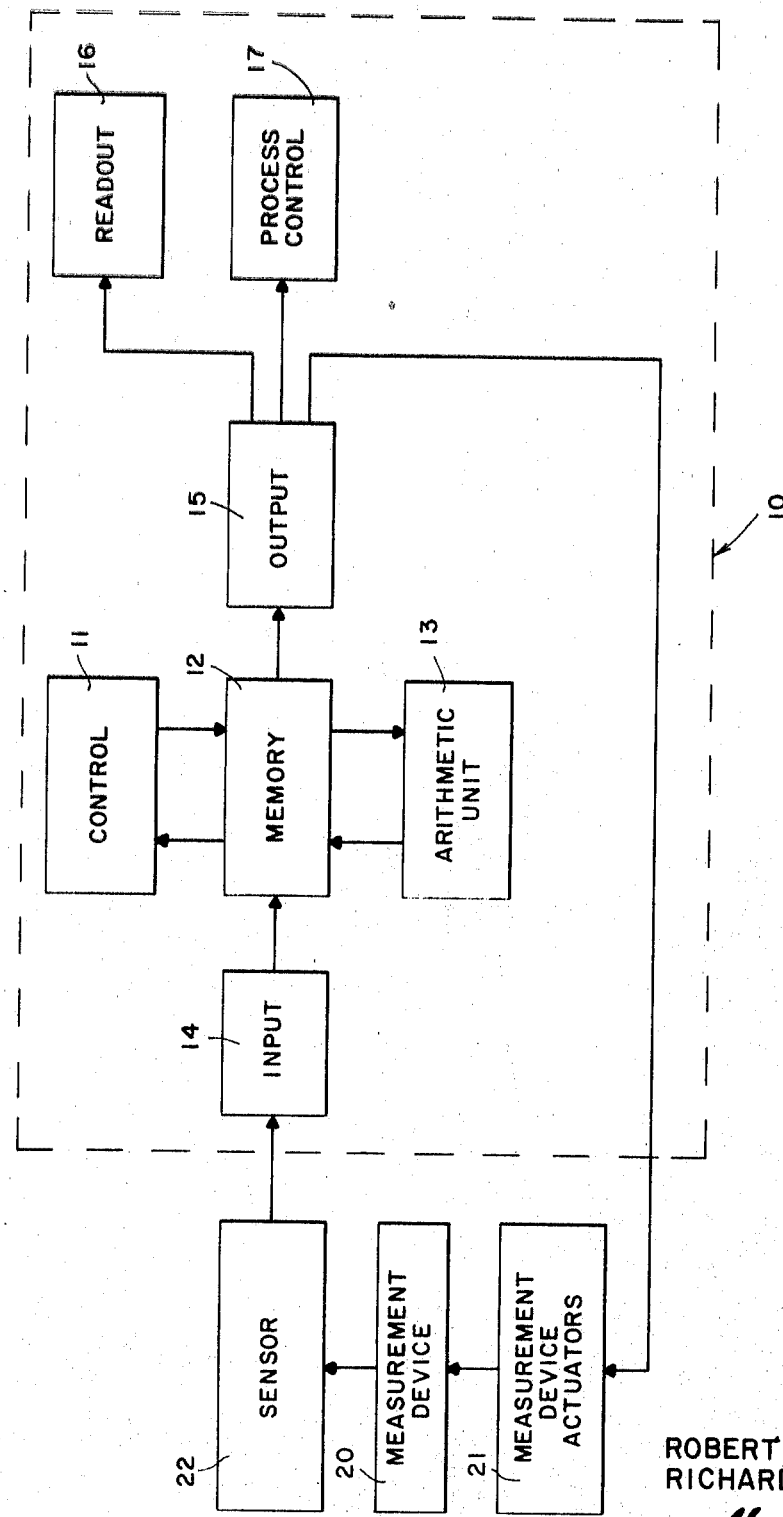
FIG. 1 is a block diagram of a closed loop computer controlled measurement system including a measurement device such as a pressure measuring instrument, a sensor for detecting information to be used by the computer in its control function, and measurement device actuators which are controlled by the computer.
Figure 19:
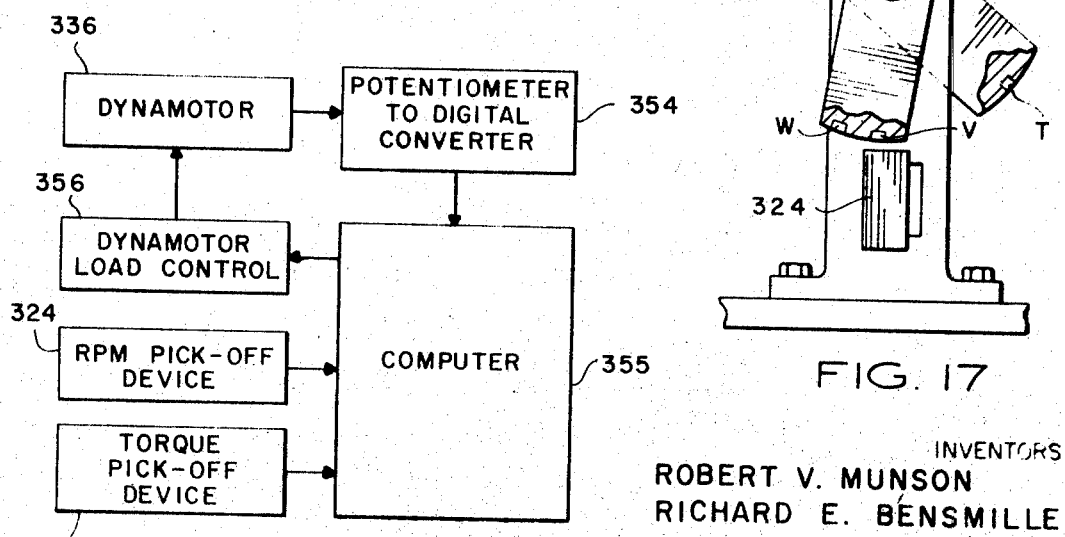
FIG. 19 is a functional block diagram of a computer controlled system including the apparatus of FIGS. 16 through 18.
Figure 20:
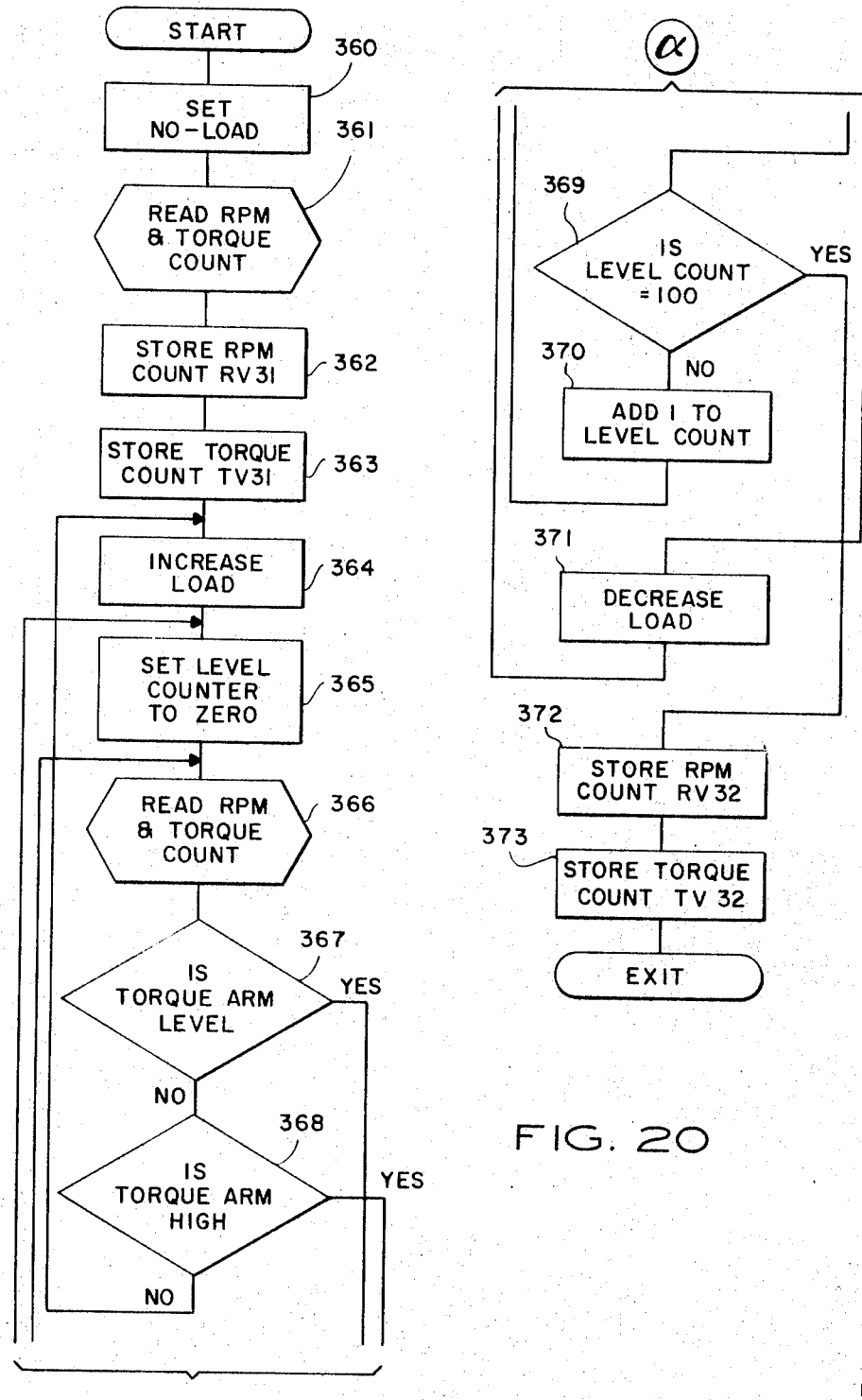
Figures 21, 22:
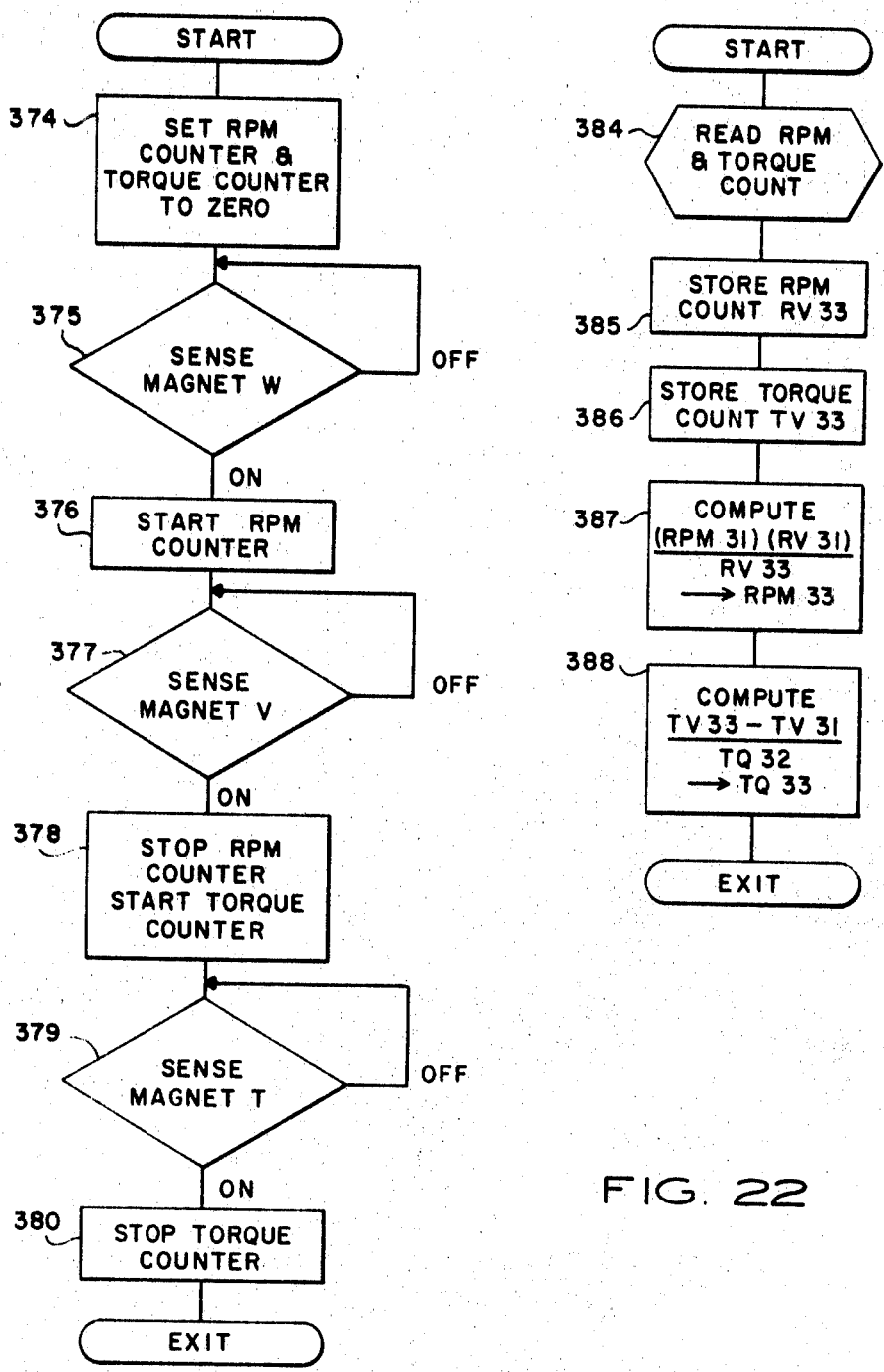
Figure 24:
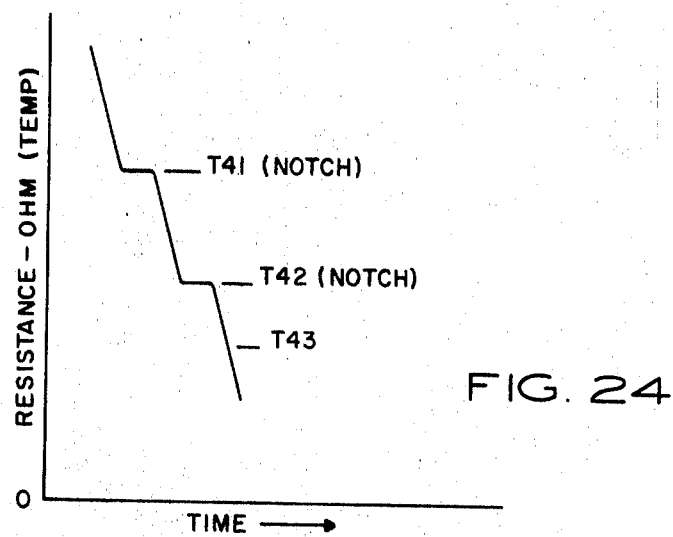
Figure 23:
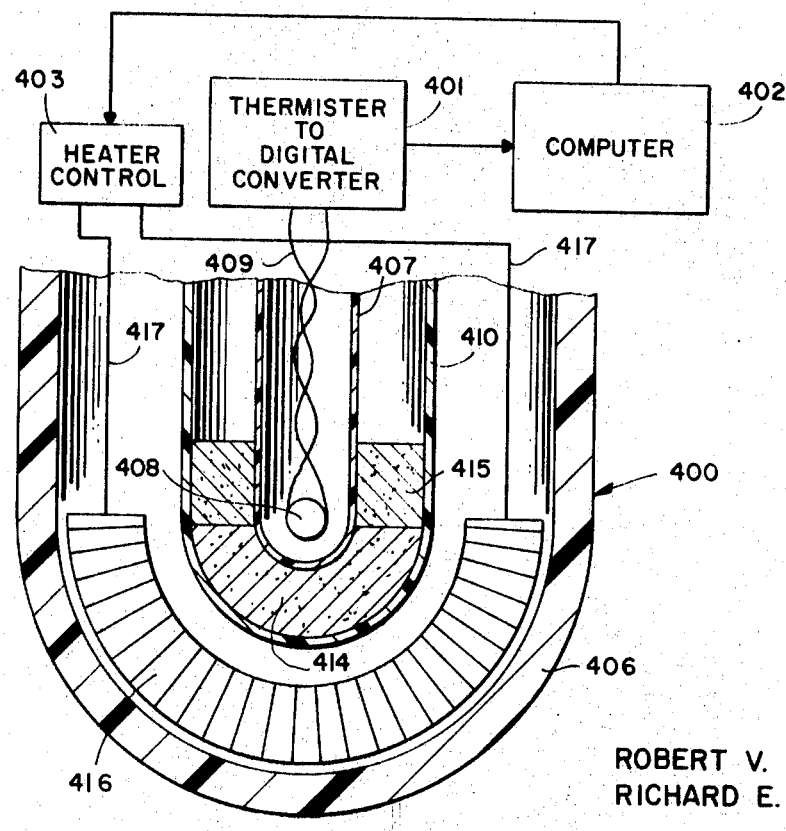
Figure 25:
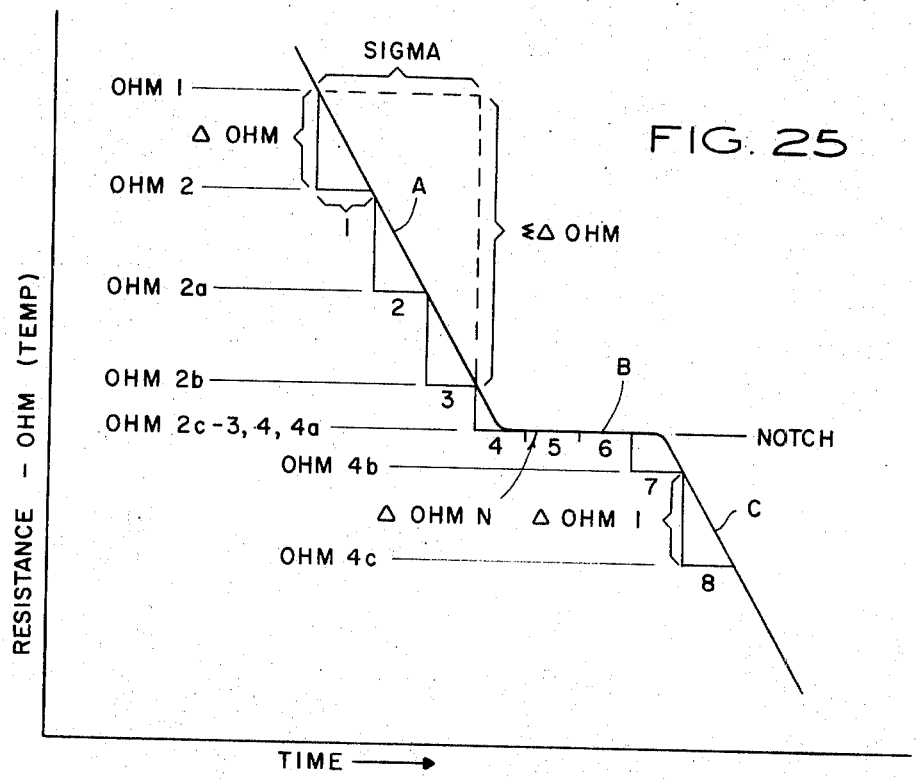
Figure 28:
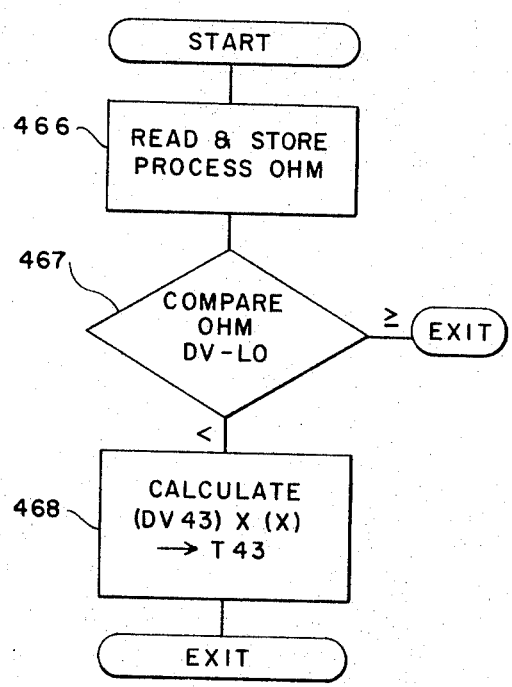
Figure 26:
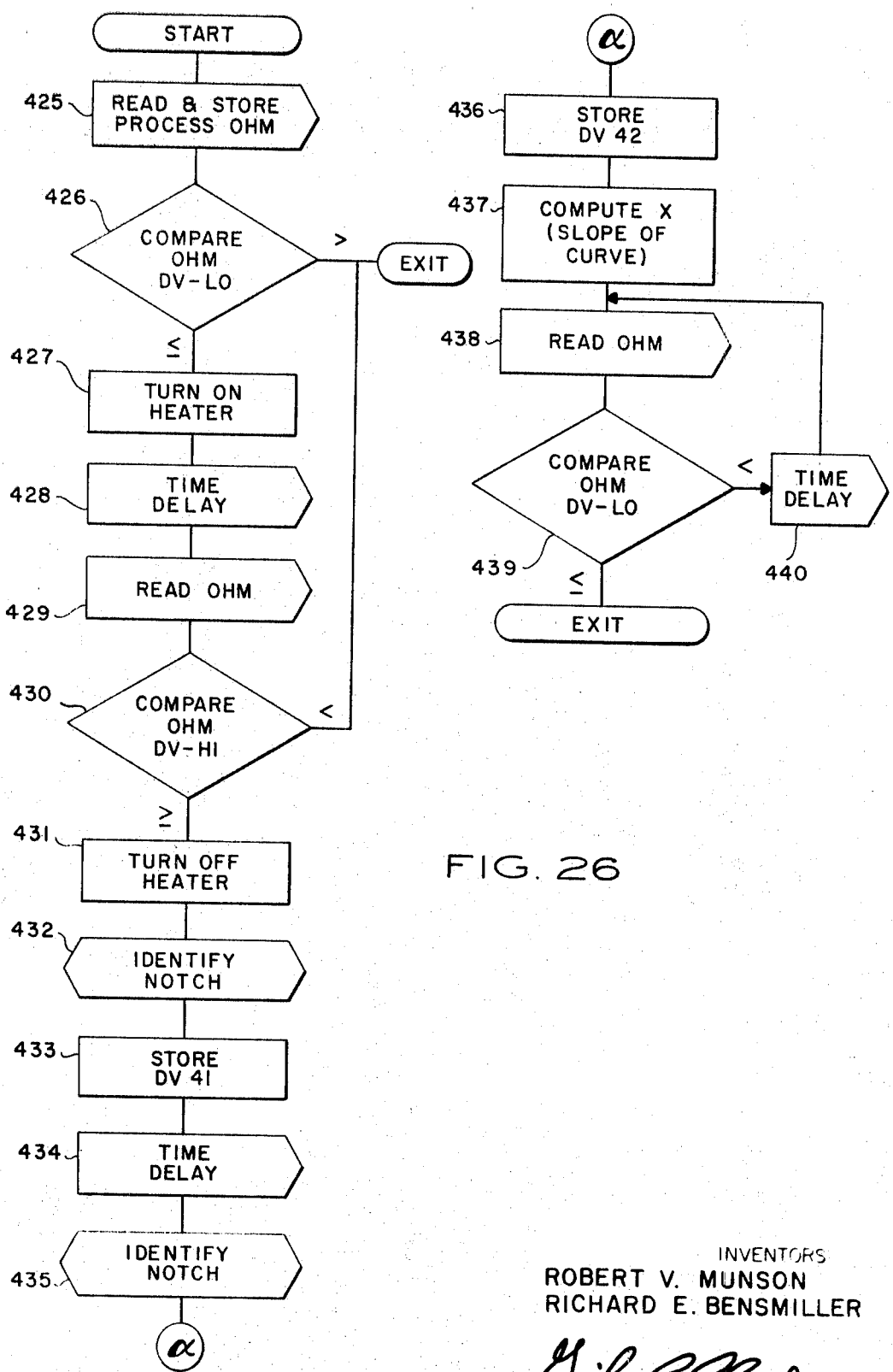
Figure 27:
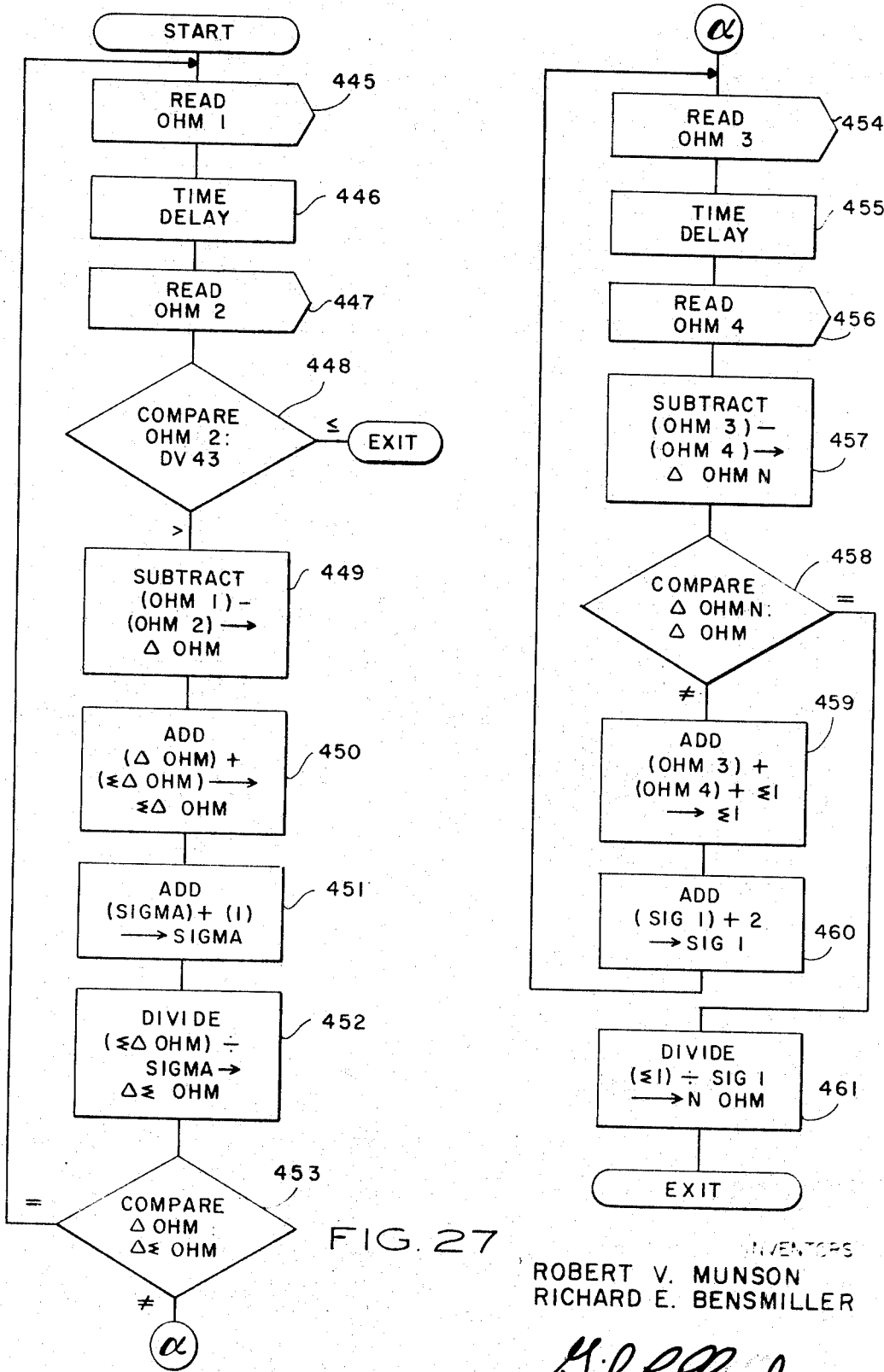

FIGS. 20, 21, and 22 are flow charts for use in preparing a computer program for the operation of a system of FIG. 19;

FIG. 23 is a combination diagrammatic illustration and block diagram, diagrammatically illustrating a temperature transducer for use in a computer controlled system as depicted in FIG. 1 and illustrating in block diagram a computer controlled temperature measuring system;

FIGS. 24 and 25 are curves illustrating the operation of the temperature measuring system of FIG. 23; and FIGS. 26, 27, and 28 are flow charts for use in preparing a computer program for the operation of the system of FIG. 23.

DESCRIPTION OF THE PREFERRED EMBODIMENTS

FIGURE 1 is a block diagram of a closed loop computer controlled system for measuring physical phenomena, such as absolute pressure or pressure differentials wherein information or data from the measurement device, such as a pressure measuring device to be described, is transmitted to the computer input. The data is processed and transferred at the computer output in a form to be used, such as a printed record or as signals for controlling other apparatus. Additionally, the measuring device is controlled by the computer output to perform measurements of known and unknown conditions of the phenomena to be measured; and this is done through control of actuators associated with the measurement device operated by the computer output.

Referring to FIGURE 1, a computer 10 includes a central processing unit which is made up of a control unit 11, a memory unit 12 and an arithmetic unit 13. The input unit 14 converts the data received from the measurement device into appropriate form for handling by the central processing unit; and the output unit 15 converts the output from the central processing unit to a form suitable for desired use. The desired form of output data may be printed information produced by a readout unit 16 or electric signals for use in a process control unit 17.

A measurement device 20 includes actuators 21 for controlling its operation, the actuators being operated by the computer output unit 15 to perform the desired measurement functions. The measurement device sensor 22 senses or detects the changes in physical phenomena and transmits information to the computer input 14.

In the specification which follows, there are described four separate and distinct systems for the practice of the method of the invention, each system including apparatus for the measurement of a particular physical phenomenon which apparatus is disclosed for use in combination with a digital computer. The apparatus and systems described include a water manometer measuring device for use in a gas pressure measuring system, a mercury manometer measuring device also for use in a gas pressure measuring system, a torsion bar transducer device for use in a torque measuring system, and a temperature transducer probe device for use in a temperature measuring system. For each of the above mentioned systems flow charts are illustrated and described, by way of example, which might be used in the preparation of a computer program for the operation of the respective measurement apparatus and systems and for the practice of the method according to the invention.

WATER MANOMETER PRESSURE MEASURING SYSTEM

One form of apparatus for practicing the method of the invention includes a water manometer pressure measuring instrument shown in FIGS. 2 through 9.

Figure 2:
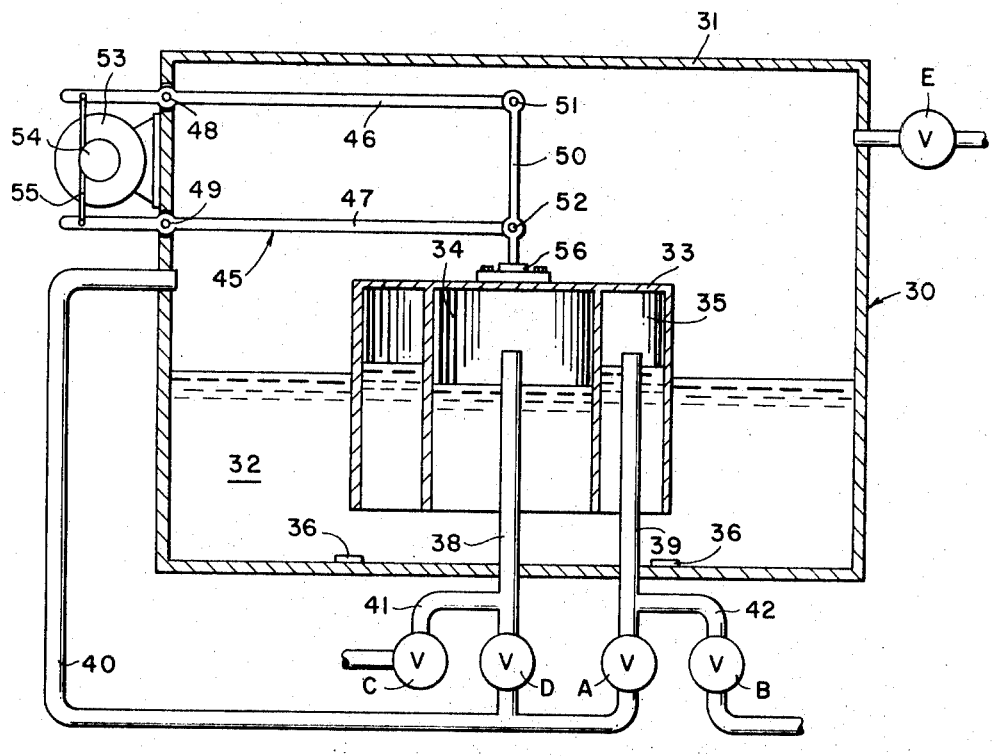
FIG. 2 is a diagrammatic illustration of a water manometer pressure measuring device for use in a computer controlled system as depicted in FIG. 1.

FIG. 2 is a diagrammatic illustration of measuring apparatus for use in a computer controlled system as illustrated in FIG. 1 and described above. Referring to FIG. 2, a measurement device 30 includes a vessel 31 for containing a pool of liquid 32, such as water, the vessel 31 being shown in the form of a closed vessel and adapted to be either pressured or evacuated to provide a reference pressure within the vessel which differs from atmospheric pressure. Additionally, the closed vessel may be pressurized with a gas other than air which is to be measured, either at atmospheric or other pressure. In the preferred embodiment, the reference pressure is atmospheric pressure which may be provided in the vessel chamber by opening the valve E to vent the chamber to atmosphere. While the following description refers to the measurement of air pressure, it will be understood that the pressure of other gases may be measured in the same manner.

A float 33 is disposed within the vessel for vertical movement in the liquid, the float taking the form for example, of an inverted cylindrical cup defining chambers 34 and 35 which are concentric about a vertical axis. The cylindrical inner chamber 34 will be referred to hereafter as the pressure chamber, while the annular outer chamber 35 will be referred to as the ballast chamber. The bottoms of both chambers are open to communicate with the liquid 32 within the vessel, with the bottom edges or skirts of the chamber walls lying in a common plane. The float is guided for vertical movement as will be described. The float may be fabricated of any suitable material which is heavier than the liquid in which it is immersed.

Figure 3:
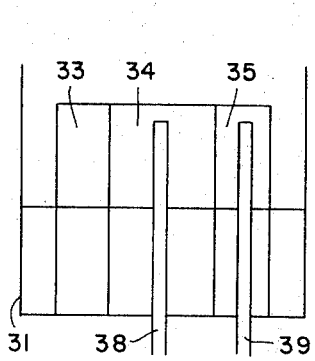
FIGS. 3 through 8 are diagrammatic illustrations of different operating conditions of the apparatus of FIG. 2.

In its lowermost position within the vessel 31, the float rests on the bottom of the vessel. This position is illustrated in FIG. 3 of the drawings which also indicates the normal level of the liquid 32, this level lying somewhat below the top of the float in its lowermost position. The float may be supported in its lowermost position by circumferentially spaced bosses 36, for example, to permit the free flow of liquid from the vessel chamber into the chambers 34 and 35, when desired. The upper portions of the float chambers 34 and 35 then define closed pockets of which are closed by the liquid 32. The chambers 34 and 35 then contain two vertical columns of water, the heights of which are controlled by the air pressures in the closed pockets of the chambers.

A stand pipe 38 extends upward through the bottom wall of the vessel 31 defining a conduit for communicating the closed portion of the pressure chamber 34 with the vessel 31 above the liquid pool and with other sources of pressurized air as will be described. Similarly, a stand pipe 39 extends upwardly through the bottom wall of the vessel 31 defining a conduit for communicating the closed portion of the ballast chamber 35 with the vessel 31 above the liquid pool and with other sources of pressurized gas as will be described. The upper ends of these conduits are always above the liquid level within the chambers to control the air pressures within these chambers.

The conduit 38 communicates through a valve D with a conduit 40 which opens through a port in the side wall of vessel 31 to the vessel chamber above the liquid level. When the valve D is opened, the pressure within the pressure chamber 34 is equalized with that in the vessel chamber which acts on the top of the float 33. Through a branch conduit 41 and a valve C, the conduit 38 is selectively communicated with an unknown pressure to be measured by the apparatus.

The conduit 39 for the ballast chamber 35 is communicated through a valve A with the conduit 40, so that the pressure in this chamber may also be equalized, when desired, with the reference pressure within the vessel chamber. Through a branch conduit 42 and a valve B, the ballast chamber is selectively communicated with a source of pressurized gas which is more than sufficient to lift the float 33 to the upper limit of its excursion, wherein the lower edges of the float chamber walls are adjacent to the upper surface of the liquid.

The valves A, B, C, D, and E may be solenoid operated to "on" or "off" conditions, and are the measurement device actuators 21 of FIG. 1 which are controlled by the computer output.

For the purpose of detecting and measuring the vertical excursion of the float 33, a form of parallelogram linkage device 45 is provided consisting of upper and lower horizontal arms 46 and 47 which extend through the vessel wall and are pivoted to the wall by means of sealed hinges 48 and 49 respectively; and a vertical leg 50 pivoted at hinges 51 and 52 to the horizontal arms 46 and 47 respectively. The leg 50 is rigidly attached to the top of the float by means of a coupler 56 to follow the vertical movements of the float and also to guide the movements of the float.

A rotary resolver or synchro 53 is mounted on the exterior of the vessel 31 and includes a drum 34 driven by a wrapped cable 35 which is secured between the arms 46 and 47. It will be seen that the parallelogram linkage and resolver provide electrical data values which are responsive to the vertical excursion of the float; and these data values may be converted by means of a resolver-to-digital converter to digital values acceptable by the computer input unit. The parallelogram linkage, the resolver, and the resolver-to-digital converter, then comprise the sensor 22 of the system of FIG. 1. The computer 10 may be programmed to perform a measurement operation and a calibration operation of the measurement device 30, by controlling the several values to produce desired conditions within the pressure and ballast chambers, with the program being responsive to the input information received from the sensor components and to predetermined information stored in the computer memory. With computer control, the instrument calibrates itself at any time through initiation of the calibration program.

Figure 9:
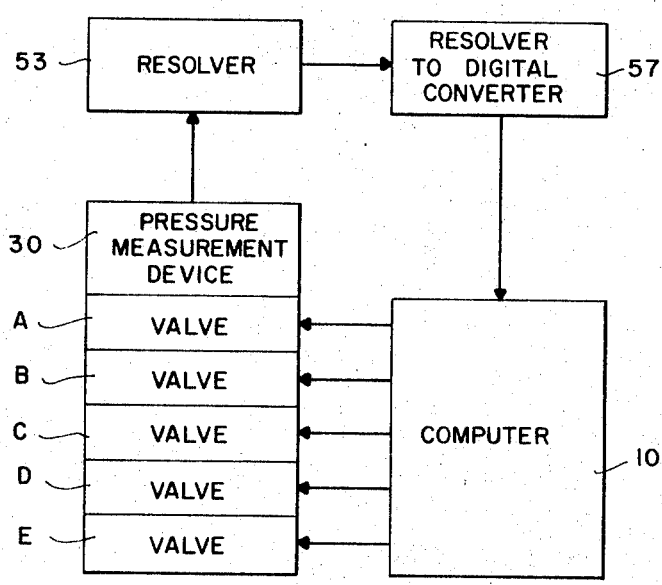
FIG. 9 is a functional block diagram of a computer controlled system including the apparatus of FIG. 2.

FIG. 9 is a functional block diagram of the measurement apparatus and computer, illustrating a closed loop system wherein the several actuator valves A through E of the measurement device 30, which may be solenoid operated valves for example, are controlled by the output of the computer in response to input from the sensor components including the resolver 53 and a resolver-to-digital converter 57. FIGS. 3 through 8 are diagrammatic illustrations relating to FIG. 2 which show different relative positions of the float 33 and vessel 31 and relative liquid levels, which will be referred to in the foregoing description of operation.

Figure 10:
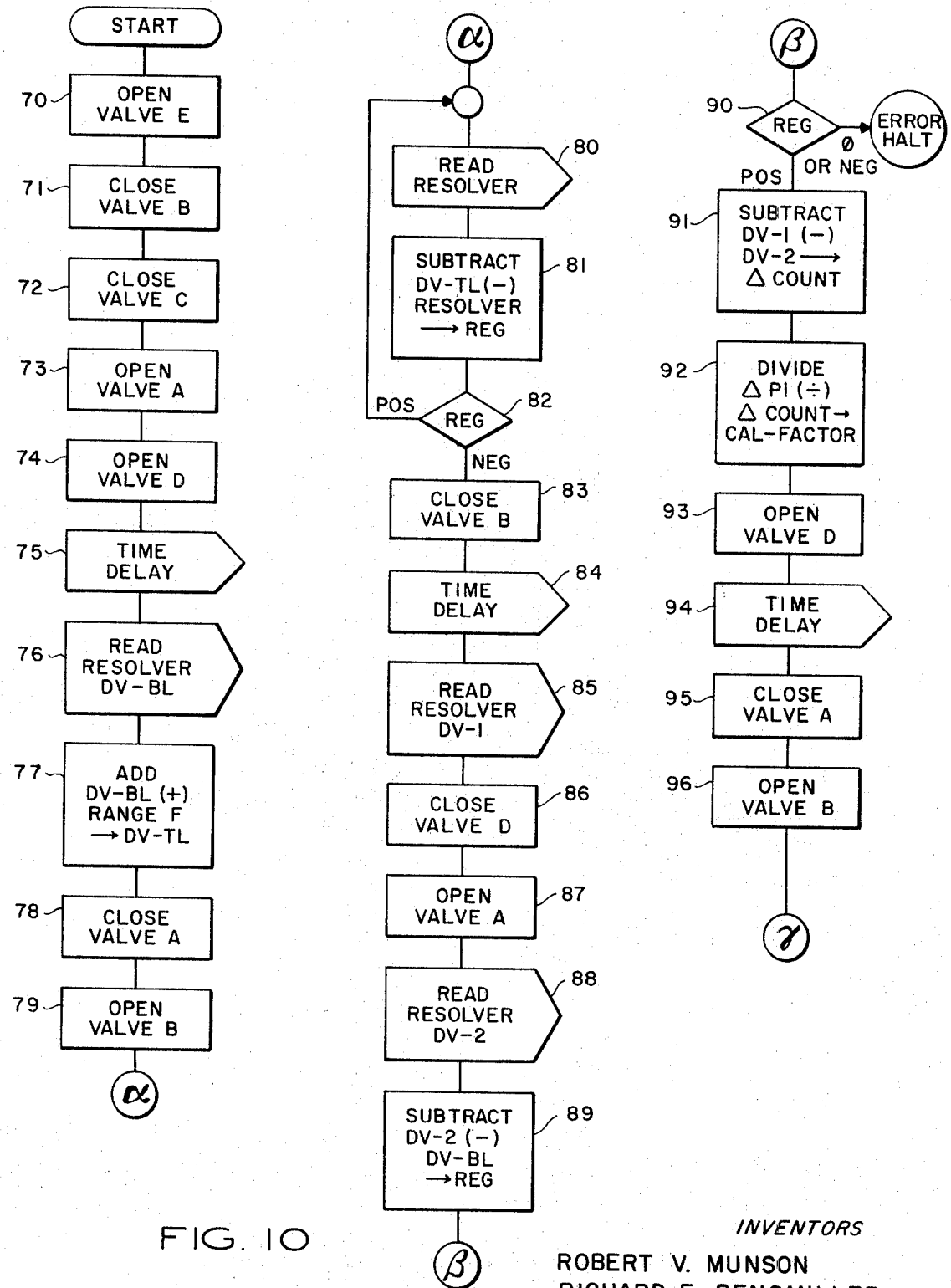
FIGS. 10 and 11 are flow charts for use in preparing a computer program for the operation of the system of FIG. 9.
Figure 11:
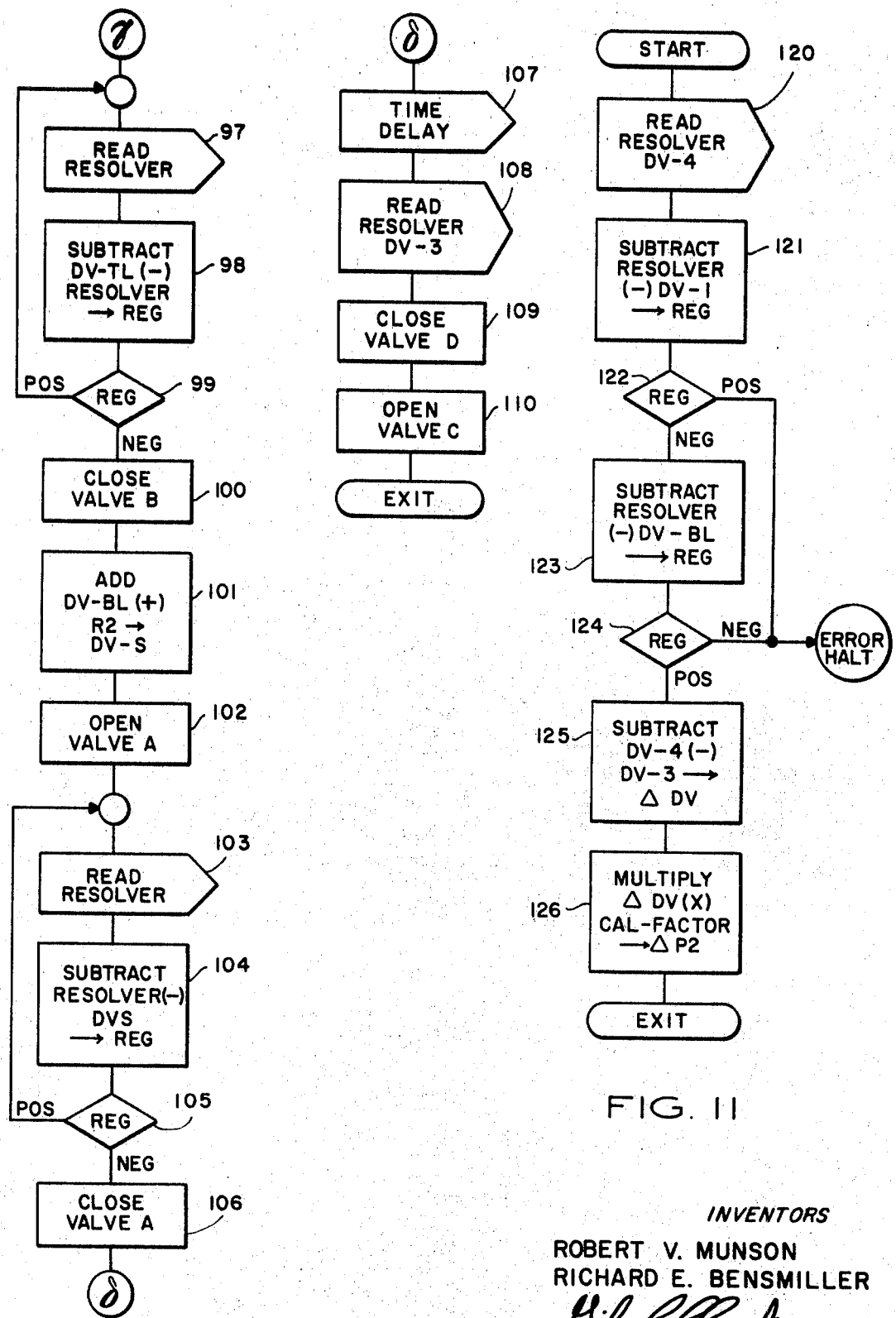

The operation of the system will now be described, first the operation in connection with the calibration of the pressure measuring instrument, then the operation in connection with measuring and computing the unknown pressure. Reference will be made to FIGS. 3 through 8 which illustrate diagrammatically the relative positions of the float within the vessel, and the relative liquid levels within the vessel 31 and the chambers 34 and 35. Reference will also be made to FIGS. 10 and 11 which are flow charts which may be used to program a computer to perform the operations described. The flow chart diagrams are numbered for reference.

It is assumed that the system is to be calibrated for the measurement of air pressure with atmospheric pressure being the reference pressure within the vessel 31; and accordingly the valve E is opened. Valves B and C are closed, and valves A and D are opened to communicate both the pressure and ballast chambers with atmosphere through the conduits 38, 39, and 40. The float, being heavier than water, will sink to the bottom of the vessel; and time is allowed for the float to sink and for the water levels to equalize in the ballast and pressure chambers (Flow chart diagrams 70 through 75.) This condition of the float is illustrated in FIG. 3. The parallelogram device 45 follows the float; and when the float reaches the bottom of the vessel, the resolver produces the data value DV-BL which identifies the bottom limit of float excursion. This data value DV-BL is stored in the computer memory for reference, to ascertain during later operations that the float is not resting on the vessel bottom (Flow chart diagram 76.)

From the design of the measuring device the maximum height to which the float may rise from the vessel bottom is known and the corresponding range of the resolver count, referred to as RANGE-F, has been predetermined and stored in the computer. The count RANGE-F, when added to the data value DV-BL, establishes a data value DV-TL which identifies the top limit of float excursion (Diagram 77).

Valve A is now closed and valve B is opened to communicate the ballast chamber with air at a high pressure which is more than sufficient to raise the float to the top limit of excursion. While the float is rising, the computer monitors the resolver readings, by making successive subtractions of the increasing resolver values with the data value DV-TL. Each difference value is stored in a register, and when the difference value becomes negative, valve B is closed by the computer and time is allowed for the water to settle to a static condition (Diagrams 78 through 84).

Figure 4:
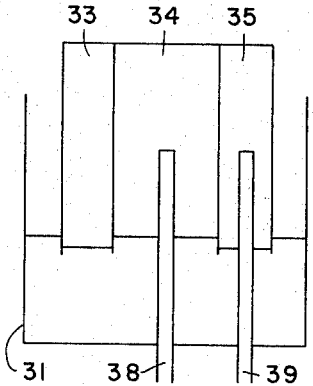

The float is now supported by the air trapped in the ballast chamber, with a small portion of the chamber skirts or walls extending below the surface of the liquid, as shown in FIG. 4. The valve D has remained open so that the pressure within the pressure chamber is atmospheric pressure. This is a first known pressure P1, a value for which has been stored in the computer. The resolver is now read and the data value DV-1 is stored in the computer memory, this data value DV-1 being a function of atmospheric pressure P1. This data value DV-1 also represents the top limit of float excursion which should not be exceeded by the instrument during subsequent operations (Diagram 85).

Figure 5:
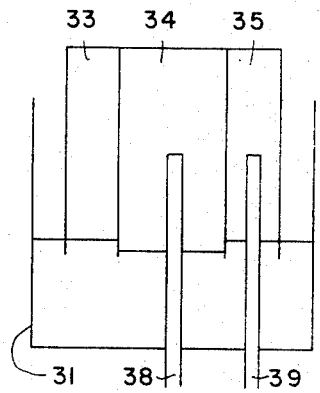

To obtain a second data value corresponding to a second known pressure, the valve D is closed to trap the air within the pressure chamber, which is now at atmospheric pressure; and the valve A is opened to vent the ballast chamber to atmosphere (Diagrams 86 and 87). The float will now sink until the air pressure within the pressure chamber increases sufficiently to support the weight of the float distributed over the surface area of the liquid within the pressure chamber. This condition is shown in FIG. 5. The air within the pressure chamber is now the sole support of the float (neglecting the displacement of water by the skirt of the float). The cross-sectional area of the pressure chamber is uniform and is known, as is the weight of the float, and from these the pressure P2 within the pressure chamber is known by computation; and a value for P2 has been stored in the computer memory. The resolver is now read and the data value DV-2 which is a function of the known pressure P2 is stored in the computer memory (Diagram 88).

Flow chart diagrams 89 and 90 are concerned with testing to determine that the float has not dropped to the lower limit of excursion represented by data value DV-BL. Data value DV-BL is subtracted from data value DV-2 with the resultant value placed in a register to determine whether it is negative or positive. If the resultant value is zero or negative, the float is resting on the bottom of the vessel and the data value DV-2 is invalid. The computer will be halted and it will be necessary to increase the volume of the liquid 32 and to restart the calibration process.

From the two values of known pressures P1 and P2 and the two corresponding data values DV-1 and DV-2, a curve of known slope is established from two points, each point having a known pressure value as one of its coordinates and the corresponding data value as the other of its coordinates.

Flow chart diagrams 91 and 92 are concerned with calculating a calibration factor (CAL-factor) which is used in the later computation of the unknown pressure. The data value DV-2 is subtracted from data value DV-1 to obtain the difference value, referred to as Δ Count which is stored in the computer. ΔP1, which has been stored in the computer, is the known pressure difference between the known pressures P2 and P1. The value ΔP1 is divided by the value Δ Count to obtain the CAL-factor which is the resolver count per unit of pressure change. This CAL-factor is stored in the computer memory.

The next phase of the operation cycle is to locate the float at a predetermined desired level within the range of its excursion for the purpose of accommodating the range of pressures which are to be measured. If the pressures to be measured are near the maximum for which the instrument is designed, the start position of the float should be near the lower limit of excursion. Conversely, if only negative pressures are to be measured it would be desirable to place the start level near the top limit of float excursion. If desired, this phase of operation may be started independently of the preceding steps of the calibration operation.

Since the position of the float at the beginning of this phase of calibration may not be known, the float is allowed to sink to the bottom of the vessel, then raised to the top limit of excursion and then allowed to drop to the pre-selected start level. Valve D is opened to permit the float to sink to the bottom of the vessel with valve A being already open, and sufficient time is allowed for the sinking of the float and for the water level to stabilize within the pressure and the ballast chambers (Diagrams 93 and 94). Valve A is then closed and valve B opened to admit high pressure air to the ballast chamber, and the float rises until the valve B is closed by the computer when the float reaches the top limits as indicated when the resolver reading exceeds the data value DV-TL (Diagrams 95 through 100).

Figure 6:
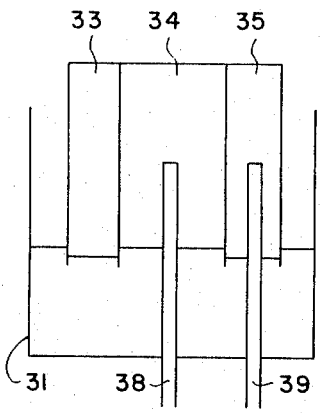

The height of the float for the beginning of the pressure measuring operation is predetermined, and a corresponding resolver count value R2 has been stored in the computer. This value R2 is added to data value DV-BL to determine the data value DV-S which represents the pre-selected float height (Diagram 101). The valve A is now opened to allow the float to sink. The computer now reads the resolver and makes successive subtractions of DV-S from the resolver reading (Diagrams 102 through 105). When the difference becomes negative, the computer closes the valve A so that the volume of air within the ballast chamber is trapped, and movement of the float halts when the pressure within this chamber is sufficient to support the float. Time is allowed to permit the float to stabilize on the liquid; then the resolver is read and the data value DV-3 is stored in the computer memory (Diagrams 106 through 108). Since the valve D is open, the pressure within the pressure chamber 34 is atmospheric; and the data value DV-3 is a function of atmospheric pressure P1, which is the reference pressure for the computation of an unknown pressure to be measured. This position of the float is indicated in FIG. 6 of the drawing.

Valve D is now closed to seal the pressure chamber from atmospheric pressure, and valve C is opened to communicate the pressure chamber with the unknown pressure which is to be measured (Diagrams 109 and 110). The calibration is completed and the apparatus is conditioned for the measurement of unknown pressures.

FIG. 11 is a flow chart for a computer program concerned with the operation of reading and computing of an unknown pressure.

Figure 7:
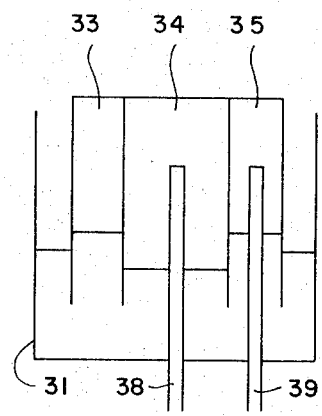

When the unknown pressure is admitted to the pressure chamber, the float will rise if the unknown pressure is greater than atmospheric pressure; this condition being illustrated in FIG. 7. This unknown positive pressure will increase the gas volume of a pressure chamber with a corresponding decrease of the water volume. As the float rises, the liquid column within the ballast chamber rises with the float above the liquid level in the vessel. In this manner the effective weight of the float is increased and the buoyancy decreased, and the float height is attained wherein the float is supported by the unknown pressure. The resolver is now read and data value DV-4 corresponding to the unknown pressure is stored in the computer (Diagram 120).

Figure 8:
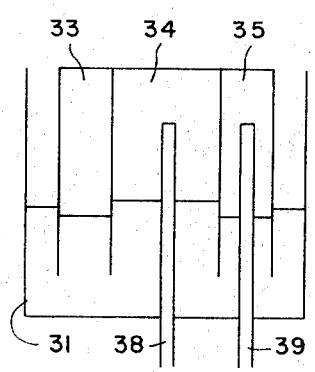

If the unknown pressure is a pressure less than atmospheric, the column of liquid in the pressure chamber will rise to increase the weight of the float, causing the float to sink within the liquid pool 32 whereby the effective buoyancy is increased. Again, a stable level of the float will be achieved which is a function of the negative unknown pressure and the data value DV-4 is stored in the computer (Diagram 120). This condition is shown in FIG. 8.

To assure that the data value DV-4 is a valid reading, the computer makes a check to determine that the computer has not moved to or beyond either the top or bottom limits. First, the computer tests to determine that the resolver data value DV-4 does not exceed the top limit data value DV-1 (Diagrams 121 and 122). Next, the computer makes a comparison to ascertain that the resolver data value DV-4 is not less than the bottom limit data value DV-BL (Diagrams 123 and 124). Passing both of these tests, the data value DV-4 is a valid function of the unknown pressure P3.

The computer then calculates the difference between the unknown pressure data value DV-4 and the atmospheric pressure data value DV-3 to compute the data value count ΔDV corresponding to the pressure difference, that is the pressure increase or the pressure decrease from the reference pressure P1 (Diagram 125). The computer then multiplies the count ΔDV by the CAL-factor to determine the pressure difference ΔP2 between atmospheric pressure P1 and the unknown pressure P3, from which the unknown pressure is determined (Diagram 126).

From the above description of the apparatus and its operation, it is seen that the apparatus is adapted for the practice of a method of providing data from which the measured value of an unknown air pressure can be mathematically determined and which includes the establishment of known pressures within the apparatus for the purpose of calibrating the apparatus. The method which is described in detail in the above description of operation includes the steps establishing a first known pressure P1, which is atmospheric pressure, in the measurement device; and storing the pressure P1 and a corresponding data value DV-1 in the computer memory; establishing a second known pressure P2 in the measurement device and storing this pressure P2 and a corresponding data value DV-2 in the computer memory; these values P1, DV-1 and P2, DV-2 respectively comprising coordinates of points which define a curve of known slope from which the calibration factor is determined; again establishing atmospheric pressure P1 in the measurement device and storing a corresponding data value DV-3 in the computer memory, the values P1 and DV-3 defining the coordinates of a point on a curve having the same slope as that of the first mentioned curve; establishing an unknown pressure in the measurement device and storing a corresponding data value DV-4 in the computer memory; the unknown pressure P3 and its corresponding data value DV–4 defining coordinates of a point of the second curve, whereby the value of unknown pressure can be mathematically determined by applying the slope of the calibration factor.

While the pressure chamber and ballast chamber for the float 33 are described and illustrated as being uniform in cross-section are preferably equal in cross-section, this is not essential to an apparatus according to the invention or to the practice of the method of the invention. The float may have a shape and configuration entirely different from that illustrated with the chambers being of different and non-uniform shape. In this event the curve defined by the values of pressure and corresponding float height may be a more complex curve; and it may be necessary to establish more than two points to define the more complex curve for the curve fitting technique.

The described method and apparatus has particular application for use with flow meters, as well as other applications where manometer type instruments are conventionally used. Where atmosphere pressure is used as the base reference pressure, for extreme accuracy it will be necessary to recalibrate the instrument when there is a significant change in the atmospheric pressure. A particular advantage of the method and apparatus is, of course, that this recalibration can be accomplished conveniently at any time with minimal interruption of the stream or process with which the pressure measurement is concerned.

MERCURY MANOMETER PRESSURE MEASURING SYSTEM

Another form of apparatus for practicing the method of the invention includes a mercury manometer type instrument, shown in FIGS. 12, 13, and 14, for the measurement of pressure. As shown in FIG. 12, the manometer includes a U-shaped tube 210, fabricated from any suitable electrically insulating material, consisting of upright legs 211 and 212 connected by a transverse base leg 213. The upper ends of the legs 211 and 212 are closed respectively by plugs 215 and 216 which are also fabricated from an electrically insulating material. The upper ends of the legs 211 and 212 include respective conduits 217 and 218 for communicating the upper chambers of the legs with air or other medium at the desired pressures. The two upright legs of the U-tube contain metallic probes 219 and 220 which are supported by the respective insulating plugs 215 and 216 through integral electrically conducting stems extending through the plugs. The probes are shaped as will be described, and are coated with a uniform layer of a dielectric material such as Teflon so that the conductive probes coacting with a conductive liquid 221, such as mercury, contained in the U-tube, function as electrical capacitors.

The two probes are tapered in a functional manner which is computed on the basis of incremental surface area of the probe contacted by the conductive liquid as it moves from one end of the probe to the other end to produce a capacitance value which varies as either a sine or cosine function through an angle of 90°. As viewed in FIG. 12, the probe 219 in the manometer leg 211 is contoured in accordance with a sine function which corresponds to a rotation of from 0 to 90° as the level of the conductive liquid in the tube 211 goes upward from the lower tip of the probe to the enlarged upper end thereof. In like manner, the probe 220 in the manometer leg 212 is contoured to produce a capacitance related to a cosine function of an angle of 0 to 90° as the level of the conductive liquid moves from the upper larger end of the probe 220 toward the bottom tip thereof.

The two probes are the same length with the upper and lower ends lying in common, horizontal planes so that when the level of the conductive liquid is at the lower tip of one probe it lies at the upper end of the other probe. In movement of the conductive liquid from this extreme to the opposite extreme, the manometer device then acts like a resolver rotating through 90° of rotation with the probes producing respective sine and cosine outputs. In other words, as the height of the conductive liquid changes relative to the probes, the respective areas of the probe covered by the liquid vary as sine and cosine functions.

As seen in both FIGS. 12 and 13, the manometer device is electrically connected in an RC bridge having two arms of equal resistance represented by the resistors 223 and 224 and having two arms of variable capacitance represented by the probes 219 and 220. The excitation voltage for the bridge is, for example, a sine wave voltage of 400 cps applied across the terminals 206 and 207. The terminal 207 is connected between the two resistance arms 223 and 224 of the bridge, while the terminal 206 is connected between the two capacitance arms 219 and 220 of the bridge, being represented by a contact mounted in the base leg 213 of the manometer tube 210 to maintain electrical contact with the conductive liquid 221. The output from the bridge is taken at terminals 225 and 226, with the terminal 225 being connected between the resistance and capacitance arms 223 and 219 respectively, and the terminal 226 being connected between the resistance and capacitance arms 224 and 220 respectively.

As seen in FIG. 13, the outputs 225 and 226 are connected to a sine-cosine converter 227 for providing output information in digital form for the input of a digital computer. Such a sine-cosine converter, suitable for use in the present system, is described in co-pending application Ser. No. 791,067 filed Jan. 14, 1969, and assigned to the assignee of the present application.

When the level of the conductive liquid is in the settle out condition as illustrated in FIG. 12, when both legs 211 and 212 of the manometer are exposed to atmospheric pressure for example through the respective conduits 217 and 218, the bridge circuit output should correspond to the 45° angle position. To achieve this output, the height of the liquid must be set at an appropriate reference level relative to the length of the probes which level may be indicated by a visible mark or indicia 231 provided on the surface of the manometer leg 211. To provide for adjusting the level of the liquid to this reference level, the manometer instrument is provided with an upright leg 214 communicating with the base leg 213 and extending upward to a point lower than the reference level. The upper end of the leg 214 is closed by a cap 232 provided with a threaded bore for receiving a plunger device 233 in adjustable threaded relation. As best seen in FIG. 13, the plunger device 233 includes a lower piston which seals against the inner walls of the leg 214; and intermediate threaded stem extending through the threaded bore of the cap, and an upper head for rotating the plunger device to effect vertical adjustment and corresponding adjustment of the liquid height in the two legs 211 and 212.

With the height of the liquid properly adjusted, the output value of the bridge circuit may be read which corresponds to a known pressure condition such as atmospheric pressure.

To establish an output for a second known pressure condition, a contact 204 is provided in the leg 211, extending into the leg to be contacted by the liquid as it rises in the leg from the reference level 231. This contact 204 is positioned a known distance above the reference mark 231, which distance is represented by $h/2$ in FIG. 13. When the liquid in leg 211 has raised to the level of the contact 204, in response to a pressure greater than atmospheric supplied to the leg 212 through the conduit 218, the liquid in the leg 212 will have dropped a corresponding distance so that at this point the difference in the height of the two columns is represented by $h$. This assumes that the surface areas of the conductive liquid in the two columns is equal and remains equal as the liquid surface moves between the extremes of the probes 219 and 220. It will be seen in FIG. 12 that the walls of the legs 211 and 212 are contoured to correspond with the contours of the probes 219 and 220 so that this surface area remains uniform in the preferred embodiment. Accordingly, when the liquid level in the arm 211 reaches the contact 204, the bridge output may be read which corresponds to the known increase in pressure; and this establishes a second known condition and corresponding output value for the system.

In order to communicate the chambers of the manometer legs 211 and 212 with selected known and unknown pressures, valves are associated with the conduits 217 and 218. A valve 200 in the conduit 217 selectively opens and closes this conduit to communicate the associated chamber with atmospheric pressure for example. The conduit 218 associated with the leg 212 includes three parallel branches each including a respective valve 201, 202, and 203 for selectively opening and closing the respective branch. In the described embodiment, the valve 201 serves to vent or communicate the chamber with atmospheric pressure, the valve 202 communicates the chamber with the high pressure air for shifting the mercury column to establish the second known pressure condition, and the valve 203 serves to selectively communicate the chamber with an unknown pressure to be measured which may be a pressure either above or below atmospheric pressure.

FIG. 14 is a schematic block diagram of an overall system utilizing the above described pressure measurement device in combination with a digital computer 235, the system being automatically self-calibrating against known pressures and having the capability of accurately measuring unknown pressures. For this system, the manometer measurement device 210 includes valves 200 through 203 each of which includes an actuator whereby the valves may be operated by the computer 235 in response to appropriate signals from the computer output. The pressure measurement device 210 includes the above described RC bridge circuit which produces output data values responsive to the pressures to be measured as detected by the heights of the liquid columns in the manometer device; and the sine-cosine converter 227 converts these data values into digital values acceptable by the computer input.

Figure 15:
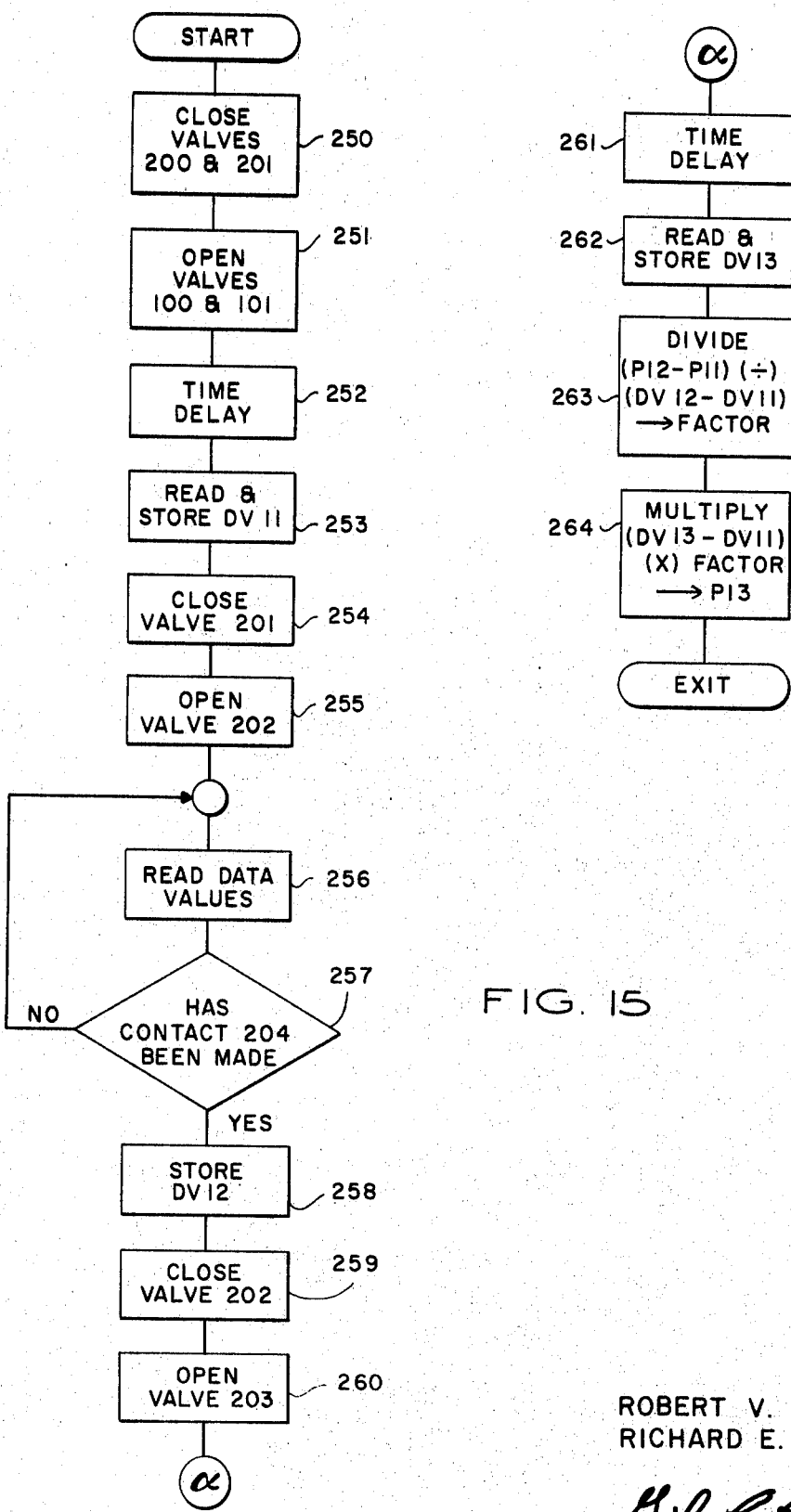
FIG. 15 is a flow chart for use in preparing a computer program for the operation of the system of FIG. 14.

The method for calibrating the system and for measuring unknown pressures will now be described with reference to the flow chart of FIG. 15 wherein the block diagrams of sequential operational steps are identified by sequential reference numbers. These operational steps may be completely controlled by the computer 235.

To begin the calibration of the measurement device 210, the valves 202 and 203 are closed and valves 200 and 201 are opened to communicate both the legs 211 and 212 of the manometer with a reference pressure, preferably atmospheric pressure. This produces the first known pressure condition in the leg 212, which will be referred to as P11, a value for which has been stored in the computer memory. After a time delay to allow the liquid to settle out at the reference level, which should be ascertained to be the level represented by the indicia 231, the data value DV 11 which is the output of the measurement device corresponding to the atmospheric pressure P11, is stored in the computer memory (Diagrams 250 to 253)

Following the storing of data value DV11, the value 201 is closed and the valve 202 is opened in response to signals from the computer output. The value 202 and its associated conduit communicates the leg 212 with air at a pressure sufficiently high to raise the liquid column in the chamber 211 above the height of the contact 204. As this pressure is admitted into the chamber 212, the contact 204 is monitored by the computer through a circuit between this contact and the contact 206; and when the potentials of these two contacts are the same, which would occur at the instant the liquid level reaches the contact 204, a resultant signal instructs the computer to read and store in its memory the data value DV12 which is the bridge circuit output corresponding to the second known pressure P12. The second known pressure P12 is known from the known atmospheric pressure P11 and the known pressure required to produce the height differential in the manometer legs; and a value for the known pressure P12 has been stored in the computer memory (Diagrams 254 to 258)

The pairs of values P11, DV11 and P12, DV12 respectively represent coordinates of two points which establish a curve from which unknown pressures may be determined through curve fitting techniques. To obtain data values for unknown pressures, the valve 202 is closed and the valve 203 is opened to communicate the chamber 212 with a source of unknown pressure. A time delay is provided to allow the liquid columns to settle out at the levels corresponding to the unknown pressure, which are presumed to be within the range of the instrument.

In the design of the manometer device, of course, the lengths of the probes 219 and 221 will be such as to accommodate the range of pressures to be measured by the particular instrument. After the time delay, the output data value DV13 which is a function of the unknown pressure, is read and stored in the computer (Diagrams 259 to 262).

The computer then calculates the unknown pressure P13 through mathematical application of curve fitting techniques. The computer calculates the slope of the curve defined by the above-mentioned pairs of values by dividing the pressure difference (P12–P11) by the difference in corresponding stored data values (DV12–DV11), with the resultant slope of the curve being identified by the word "factor" in Diagram 253. The unknown pressure P13 is then determined by multiplying the data value difference (DV13–DV11) by Factor (Diagram 264) For each additional unknown pressure to be measured, a new data value DV14, and following, is stored in the computer and the value of the corresponding pressures P14, and following, are readily computed.

The above described method and apparatus may be used in any applications where conventional mercury manometer instruments may be used, such as in vacuum work. An advantage of a mercury manometer instrument is that it maintains its accuracy longer than other types of pressure measuring instruments; and this feature adds to the value of a measuring system as above described having the accuracy and flexibility provided by computer control.

TEMPERATURE MEASURING SYSTEM

Another form of apparatus according to the invention for practicing the method of the invention includes a temperature transducer and associated apparatus illustrated in FIG. 23. The temperature transducer, as illustrated in FIG. 23, consists of a temperature detecting probe, including a thermister and other elements to be described which is placed in the medium or environment whose temperature is to be measured; and the device is calibrated without removing it from its operating environment, and under operating conditions of the apparatus or process for which the temperature measuring system is provided. The thermister modulates an electrical resistance which is responsive to the temperature of the probe. For the purpose of calibrating the transducer probe, the probe includes two or more materials of known ice points; and the system provides for the detecting of the thermister electrical resistance at these ice points. Thereafter a process temperature may be calculated from the electrical resistance by extropolation.

Referring now to FIG. 23, there is shown diagrammatically the tip of a temperature transducer probe 400 which includes an outer sheath 406 fabricated of a material having good heat conducting properties. An inner sheath 407 defines a central chamber enclosing a thermister 408 and attached leads 409; and this inner sheath 407 is surrounded by an intermediate sheath 410 defining an intermediate chamber with the inner sheath 407, and defining an outer chamber with the outer sheath 406. The intermediate chamber provides separate compartments for enclosing a first calibration material 414 and the second calibration material 415. The compartments for these two calibration materials are in intimate relation with the thermister 208, so that the thermister will detect temperature changes influenced by these materials as will be described. The compartments containing the calibration materials 414 and 415 are sealed from each other since the calibration materials will change from solid to liquid state during the calibration procedure. The outer chamber between the sheaths 410 and 406 contains a heater element connected by suitable leads 417 to a heater control 403. The heater element generally surrounds the compartments containing the calibration materials, to readily effect the heating and melting of these materials as will be described.

Considering now the overall system as illustrated in the block diagram in FIG. 23, the thermister of the transducer 400 is electrically coupled to a thermister-to-digital converter converter 401 which converts the electrical resistance of the transducer to digital values for storing and processing by the computer 402. The computer processes the transducer inputs, as will be described in connection with the operation of the temperature measuring system, and controls the operation of the heater control 403 at appropriate times during the calibration cycle.

The method for calibrating the system will be briefly outlined with reference to the curve of FIG. 24, which is a plot of the thermister electrical resistance (responsive to temperature) in relation to time. The calibration materials 414 and 415 are selected in relation to the temperature range for which the transducer is designed; with the ice points for the two calibration materials lying above the highest temperature to be measured. For convenience in the following description, the temperature to be measured will be referred to as the "process temperature." Actually, the process temperature influences the calibration, as will be described; and the calibration procedure is carried out under operating conditions where the probe is subject to the process temperature.

It may be assumed for example, that the process temperature to be measured or monitored is in the area of 100° F. The first calibration material may be selected then having the higher ice point of 158° F. for example; while the second material has a lower ice point of 117° F. for example. In the following description, the ice point temperature for the first material having the higher ice point is designated T41, while the ice point temperature for the second material having the lower ice point is designated T42. The unknown process temperature, whose value is to be determined, is designated T43.

Referring now to the curve of FIG. 24, the calibration is accomplished by operating the heater to heat the calibration materials 414 and 415 to a temperature sufficiently above the higher ice point temperature T41 so that both materials are completely converted to the liquid state. The heater is then turned off, and the probe is permitted to cool while the transducer output is monitored by the computer. As illustrated in the curve of FIG. 24, the cooling rate is generally constant with respect to time, until the temperature lowers to the temperature T41 of the first calibration material. Because of the evolution of heat from the first material during the process of solidification, the cooling rate of the probe slows and this is detected as a change in the slope of the curve as seen in FIG. 24. This will be referred to as a "notch" in the curve; and the thermister electrical resistance is stored in the computer as a data value DV41 which corresponds to the known temperature T41.

A similar notch is detected for the ice point of the second calibration material; and a thermister electrical resistance is stored in the computer memory as data value DV42 corresponding to the known lower ice point temperature T42. From these data values and temperature values, the overall slope of the curve can be calculated; and the unknown process temperature T43 may be calculated from the thermister electrical resistance at the process temperature, which is stored in the computer as data value DV43.

The operation of the temperature measuring system, and the method for calibration of the system and for making temperature measurements will now be described with reference to the flow charts of FIGS. 26, 27, and 28 and to the curves of FIGS. 24 and 25.

Prior to the beginning of the calibration and measurement procedure, certain known or predetermined information is stored in the computer memory. The known ice point temperatures T41 and T42 for the two calibration materials are stored in the memory for use in the calculations. Also, two "limit values" are stored in the memory for the purpose of ascertaining during the calibration procedure that a good and valid calibration has been made. One of these is a thermister electrical resistance value which corresponds to a temperature at least slightly below the lower or lowest ice point temperature of the calibration materials. This "low limit value" will be referred to as DV-LO in the following description. Another thermister electrical resistance value stored in the computer is a data value for a high temperature which is above the higher or highest ice point temperature for the calibration materials. This high limit value will be referred to as DV-HI in the following description.

The flow chart of FIG. 26 outlines the routine for the calibration procedure. As indicated above, the calibration procedure is preferably performed under operating conditions and the first step is to read a transducer output value for the ambient temperature which would be the process temperature; and this is stored as data value DV43 (Diagram 425). This output value DV43 is then compared with the above mentioned low limit value DV-LO. If the process value is greater than the low limit value, the procedure is aborted since the process temperature then likely lies above the lower ice point temperature of the calibration material, and a valid calibration cannot be made. In other words, the process temperature is outside the range of this particular transducer. If the process value is either equal to or less than the low limit value, the calibration procedure proceeds (Diagram 426).

The computer then directs the heater control 403 to turn on the heater element 416, and performs a time delay for the temperature within the transducer probe to increase to a predetermined value (Diagrams 427 and 428). The computer then performs the reading and temporary storing of the transducer output, and compares this value with the above mentioned high limit value DV-HI, the value DV-HI representing a temperature above the highest ice point temperature of the calibration materials. If the output value is lower than the value DV-HI, the transducer temperature has not been increased sufficiently to effect a valid calibration (possibly due to heater problems) and the procedure is aborted. If the transducer output value is equal to or greater than the value DV-HI, the procedure continues and the heater is turned off under computer control (Diagrams 429, 430, and 431). This checking procedure (Diagram 403) assures that both of the calibration materials 414 and 415 have been heated to a temperature sufficiently above their ice point so that both materials are in their state; and, accordingly, a valid calibration can be made.

The probe is then permitted to cool at a rate determined by the ambient conditions including the process temperature; and the computer performs a determination of the data value for the higher ice point temperature. This procedure is a subroutine labeled "identify notch" (Diagram 432); and the flow chart of FIG. 27 outlines the "identify notch" subroutine. The "notch" refers to one of the notches or steps in the curve of FIG. 24, discussed above which identifies the data values for the respective ice points of the calibration materials.

To explain the "identify notch" procedure, reference will be made to FIG. 25 which shows a portion of the curve of FIG. 24. The curves of FIGS. 24 and 25 chart the rate of cooling of the transducer probe; and there are indicated on the curve of FIG. 25 as changes in the transducer output identified as Δ ohm and Δ ohmn, representing changes in the transducer output per discrete units of time identified by the number 1 in FIG. 25.

The curve of 25 is divided into portions A, B, and C. The portion A represents the rate of cooling when both calibration materials are in a stable state, in the liquid state for example; the portion B represents the rate of cooling when one of the calibration materials is changing from the liquid state to the solid state, the material having the higher ice point for example; and the portion C represents the rate of cooling when the two materials are again in a stable state with one material now being in the liquid state and the other still in solid state for example. The rates of cooling represented by the curve portions A and C are the same; and the rate of cooling represented by the portion B is slower because of the evolution of heat from the material during its change from the solid state to the liquid state.

Now referring to the flow chart of FIG. 27, the computer monitors the transducer outputs at the uniform time intervals beginning with the reading and storing of value ohm 1 and, after the time delay (indicated as time increment 1 in FIG. 25), the reading and storing of value ohm 2 (Diagrams 445–447).

The value for ohm 2 is then compared with the stored data value DV43 for the process temperature. If the present temperature of the probe is equal to or less than the process temperature, it is already below the ice point, and no calibration can be made. This indicates the "notch" has not been successfully identified and the routine is terminated. If this condition does not exist, the routine continues (Diagram 448). The computer then subtracts the ohm 2 from ohm 1 to determine Δ ohm which is the transducer output change for one unit of time (Diagram 449). The computer makes a summation of the value changes Δ ohm by adding each monitored value change to the previous total identified as ΣΔ ohm; and this sum produces a new value ΣΔ ohm which is stored temporarily in the computer (Diagram 450). The computer also counts the time intervals, the sum being referred to as "Sigma," and for each computation of Δ ohm the computer adds one unit to the sum Sigma (Diagram 451). The computer then divides the summation ΣΔ ohm by the summation Sigma to produce an average value change referred to as ΣΔ ohm. The last temporarily stored value of Δ ohm is compared with the average value change ΣΔ ohm (Diagram 453); and if these are equal the computer recognizes that the slope of the curve has not changed, and the routine of Diagrams 445–453 is repeated. With reference to FIG. 25, after the next time interval (time increment 2), the value for ohm 2a is temporarily stored, a new value Δ ohm and a new summation ΣΔ ohm determined and a new average change ΔΣ ohm calculated and the comparison again made. If again the slope of the curve is not changed, the value emf 2b is stored and the procedure of Diagrams 445–453 is repeated.

When the last stored value of Δ ohm does not equal the average value ΔΣ ohm, this indicates that the slope of the curve has changed and the routine continues in accordance with Diagrams 454 and following. This situation is illustrated in FIG. 25 wherein the value change Δ ohm calculated between the values ohm 2b and the ohm 2c (during time increment 4) will be smaller than the stored average value change ΔΣ ohm, thus indicating the change in the slope of the curve. The output value ohm 2c is now stored in the computer memory as output value ohm 3; and after the standard time delay (time increment 5) the output value ohm 4 is read and stored in the computer (Diagrams 454, 455, and 456). The value ohm 4 is subtracted from the value ohm 3 to calculate the first value change Δ ohmn for the notch portion B of the curve of FIG. 25. The change value Δ ohmn is then compared with the last value Δ ohm (Diagram 458), this procedure being made to detect the change from the portion B of the curve to the portion C. For this first value change of Δ ohmn the comparison will prove not equal, and the routine will proceed (Diagrams 459 and 460). The values ohm 3 and ohm 4 are then added to produce a summation designated Σ 1 which is a sum of the output values read and stored as the temperature falls through the portion of the curve B. Simultaneous with the summation of output values ohm 3 and ohm 4, the computer makes a summation of time referred to as "SIG 1" by adding appropriate increments of time as the output values are summed. The procedure outlined by Diagrams 454–460 is then repeated to read values ohm 4a (after time increment 6), ohm 4b (after time increment 7), and ohm 4c (after time increment 8), as indicated in FIG. 25 with the determination of Δ ohmn in each case and the comparison of this change value to the last stored value Δ ohm.

With reference to the curve of FIG. 25, when the value Δ ohm 1 is ascertained by subtracting value emf 4c from value emf 4b, (Diagram 457), the when this value Δ ohm 1 is compared with the change value Δ ohm (Diagram 458), these change values will be equal. This indicates that the slope of the curve identified by these two values is the same and that the cooling rate is now indicated by the curve portion C, therefore indicating that the notch indicated by the curve portion B has been passed.

The computer then divides the sum Σ 1 of output values (the sum of values ohm 3 through ohm 4b) by the corresponding time count SIG 1 to determine the average output value designated N ohm (Diagram 461). The value N ohm is the average output value of the notch portion B of the curve of FIG. 25; and this value is stored in the computer memory as the data value corresponding to the ice point temperature of the material which produced this particular notch in the curve. This completes the "identify notch" subroutine; and referring now to Diagram 433 of FIG. 26; the just determined value N ohm is stored in the computer memory as data value DV41 corresponding to the ice point temperature T41.

After a time delay (Diagram 434), the computer again programs the "identify notch" subroutine to identify the lower notch or step indicated in the curve of FIG. 24 associated with the ice point temperature T42 for the calibration material having the lower ice point temperature. Following the calculation of the value N ohm for the second notch, this value is stored in the computer memory as data value DV42 corresponding to the temperature T42 (Diagram 436).

With the values now stored in the computer memory, the slope X of a calibration curve may now be calculated, this curve being established by two points of which the temperature T41 and T42 are one coordinate and the respective data values DV41 and DV42 are the other coordinate. The slope X is computed from the following formula:

$$X = \left[\frac{T41 - T42}{DV41 - DV42}\right] - \left[\frac{DV42(T41 - T42)}{T41 - T42}\right] + T42$$

To assure that process temperature data values are correct, the existing transducer output is read and stored in the computer (Diagram 438) and compared with the value DV-LO to determine whether or not the temperature of the transducer probe is at or below this low limit temperature (Diagram 439). If not, additional time delays (Diagram 440) are programmed with further comparisons being made to permit time for the probe temperature to drop below this low limit temperature. When the probe temperature does drop below the low limit temperature, the calibration routine is ended.

FIG. 28 is a flow chart outlining the routine for reading the data value for the process temperature and calculating the process temperature. This routine may be carried out immediately following the calibration routine or at any time following the calibration routine; and it may be performed either continuously or intermittently in an application, for example, where a process temperature is continuously monitored for indicating changes in process conditions or perhaps for directly controlling the process changes through the computer. For this routine, the transducer output is read and stored in the computer (Diagram 466) and compared with the low calibration temperature value DV-LO (Diagram 467). The process temperature must be below this low limit temperature for the temperature calculation to be valid. Should the process temperature lie above the low limit temperature and possibly within one of the ice point temperature ranges, the transducer output may not be an accurate representation of the process temperature. Accordingly, if the output value for the process temperature is either equal to or greater than the low limit temperature, the routine is terminated. If the process temperature value is less than the value DV-LO, this process temperature value is then stored as the data value DV43; and the computer calculates the process temperature T43 by multiplication of the value DV43 and the value X for the slope of the calibration curve. In a monitoring function, the computer may continuously calculate and read out the process temperature.

If for any reason it is believed that the calibration is inaccurate, due to changes in the process for example, the computer may be addressed to again perform the calibration routine and calculate a new value X for the slope of the calibration curve.

It will be apparent that the above described method and apparatus may be used in any situation where the temperature of a medium or environment may be measured with a temperature detecting probe. A particular feature and advantage of the system and method is that once the particular transducer is selected for the operating range of the particular process, the transducer need not be disturbed and the process temperature may be calculated as frequently or infrequently as desired; and the instrument may be calibrated at any time, even prior to each temperature calculation if desired, without disturbing the process or apparatus with which the temperature measuring system according to the invention is employed.

TORQUE MEASURING SYSTEM

Another form of apparatus according to the invention for practicing the method of the invention includes a torque transducer and associated apparatus illustrated in FIGS. 16 through 19. The torque transducer, illustrated in FIG. 16, is mechanically coupled into the apparatus of which it is desired to measure or monitor the torque load, with the transducer being connected with the computer to control the measurement and computation of torque load. For the purpose of calibrating the transducer, the transducer is mechanically coupled to a driving source and to a dynamotor, and is again connected to a computer for a calibration procedure controlled by the computer.

Figure 17:
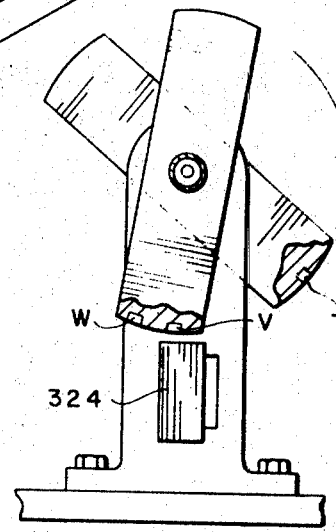
FIG. 17 is a transverse sectional view taken along the line 17—17 of FIG. 16.

The transducer 300, as best shown in FIGS. 16 and 17, includes a drive shaft made up of a torque bar 302 and sleeves 317 and 327, the torque bar having enlarged ends 303 and 304 and a reduced diameter intermediate portion to permit the desired rotational deflection in relation of the load to be measured by the particular torque bar. The drive shaft 301 is rotationally supported by means of four bearings 305, 307, 309, and 311 mounted in respective pillow blocks 306, 308, 310, and 312; with the pillow block being, in turn, supported on a base 313 for the transducer assembly.

The driven end of the transducer 300 is identified by the enlarged end 303 of the torque bar 302; and a coupler 316 is shown attached to this end of the torque bar by means of which the transducer may be coupled to an appropriate drive source (not shown) associated either with the apparatus being tested or with the calibration apparatus to be described. The revolutions of the torque bar are measured at the driven end of the transducer; and this is accomplished through the cylindrical sleeve 317 having an inner diameter only slightly larger than that of the enlarged end 303 of the torque bar. The outer end of the sleeve is nonrotatably coupled to the end 303 of the torque bar by means for example, of a collar 318 carrying a transverse pin extending through aligned holes in the sleeve and the torque bar. This sleeve extends inwardly, being rotatably supported in the above mentioned bearings 305 and 307.

An RPM disc 320, preferably fabricated of a light weight non-magnetic material such as a plastic material, is nonrotatably mounted on the sleeve 317 by means of a flange 321 for example. This disc may be elongated, as best seen in FIG. 17, and has embedded in one end thereof two magnets W and V. These magnets coact with a magnetic pick-off device 324, supported on the pillow block 308 by means of a suitable bracket, for the purpose of triggering a microsecond counter which produces a count of the elapsed time between the passage of magnets W and V which are spaced apart a predetermined angular distance relative to the axis of rotation. By means of this "velocity count," the angular velocity of the RPM disc and of the sleeve 317 may be computed.

A second cylindrical sleeve 327 having an inner diameter slightly larger than that of the torque bar end 304, at the load end of the transducer, is nonrotatably fixed to the torque bar end by means of a collar 328 carrying a pin extending through transversely aligned holes in the sleeve and the shaft end 304. A torque disc 330, similar in configuration to the disc 320, is nonrotatably fixed to the sleeve 327 by means of a suitable collar 331, for example; and this disc carrys a single magnet T embedded in one end thereof. The magnet T coacts with a second magnetic pick-off device 334 supported on the pillow block 310 by means of a suitable bracket, the pick-off device 334 detecting the passage of magnet T to shut off a microsecond counter which produces a count responsive to the angular deflection of the torque bar 302 as will now be explained.

As is apparent from the above description, the sleeve 317 is effectively an integral extension of the torque bar driven end 303, while the sleeve 327 is effectively an integral extension of the load end 304; and with the twisting or rotational deflection of the reduced diameter portion between the ends 303 and 304, there will be relative angular displacement of the sleeves and, therefore, of the RPM disc 320 and torque disc 330. Assuming that the torque transducer is driven in the direction of the arrows in FIGS. 16 and 17, that is clockwise as viewed from the right in FIG. 17, the magnet W of the RPM disc 320 will pass its associated RPM pick-off device 324 ahead of the magnet V. The torque disc 330 is mounted relative to the RPM disc 320 so that its magnet T will pass its associated torque pick-off device 334 after the magnet passes its associated pick-off device under no load conditions.

To obtain a count which is responsive to the amount of angular deflection between the torque disc 330 and the RPM disc 320, the torque microsecond counter is started in response to a signal from the magnetic pick off 224 which detects the passing of the magnet V; and this counter is stopped in response to a signal from the magnetic pick-off 334 in response to the passing of the magnet T. This produces a "displacement count" responsive to the relative angular displacement between the discs but which is also responsive to the angular velocity of the assembly. A "torque count" is readily computed from the "velocity count" and from the "torque count," the actual angle of deflection between the disc 320 and 330 may be calculated, this being a function of a torque applied to the shaft 302.

Figure 18:
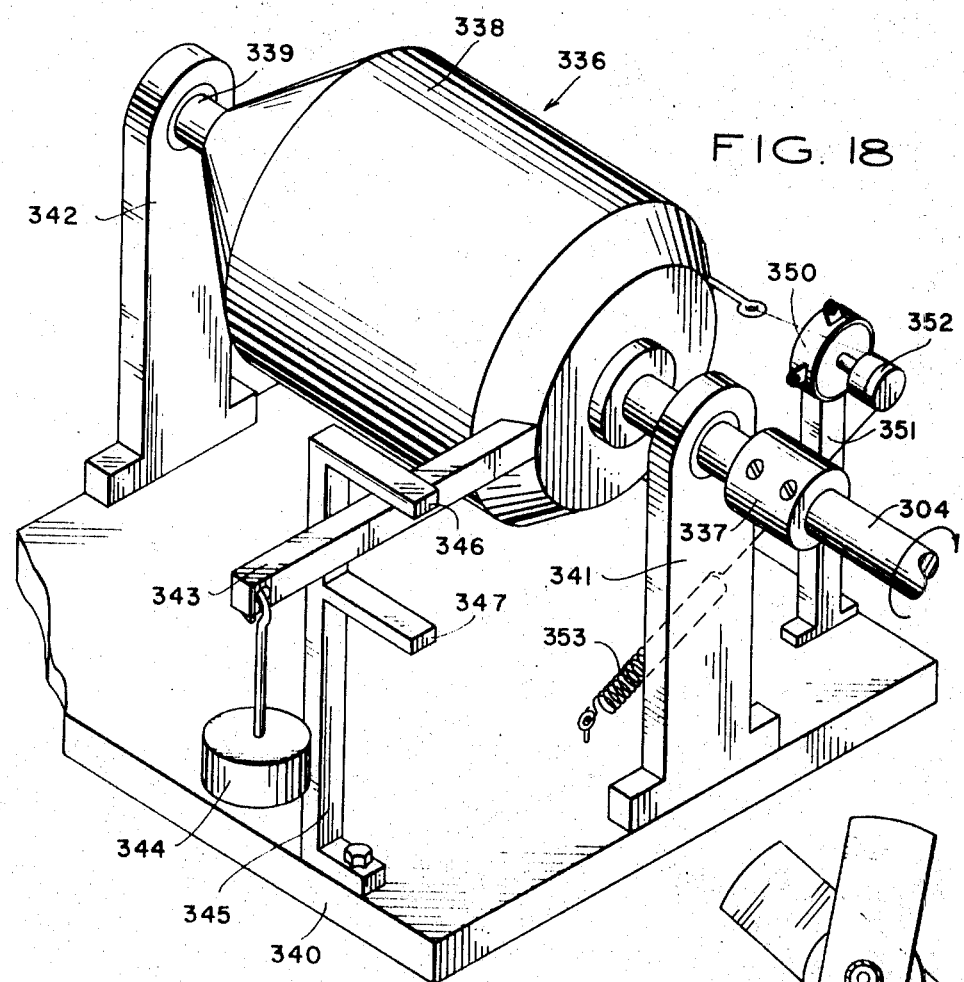
FIG. 18 is a perspective view of a dynamotor for use with the torque transducer of FIG. 16.

For the purpose of calibrating the transducer 300, the driven end of the shaft 301 coupled to a driving source such as an electric motor through the coupling 316, and the load end 304 of the drive shaft may be coupled by means of a coupling 337 to a dynamotor 336, shown in FIG. 18 which functions as a dynamometer. The dynamotor includes a frame or housing 338, and the armature shaft 339 extending from both ends of the frame rotatably supports the armature within the frame. The dynamotor is supported on a base 340 by means of pillow blocks 341 and 342 carrying bearings for rotatably supporting the motor shaft 339 at opposite ends of the frame. In this manner, the dynamotor 336 is supported in a manner that its frame 338 is free to rotate. A radially extending arm 343, affixed to the motor frame 338, functions as a weight or torque arm for supporting the weight 344 for the purpose of placing a selected "standard" torque load on the dynamotor frame. The arm 343 also coacts with a bracket 345 mounted on the base 340 and having integral upper and lower transversely extending arms 346 and 347, respectively, defining a yoke for limiting the excursion of the arm 343 and thereby limiting the oscillation of the dynamotor housing 338.

When balancing the standard load placed on the dynamotor housing with an electric load, the radially extending torque arm must be disposed substantially horizontal; and a mechanism is provided for producing a signal to indicate whether or not the arm is in the desired horizontal position. The mechanism includes a potentiometer 350 having a housing rigidly supported on the base 340 by means of a suitable bracket 351, and having a drum 352 nonrotatably fixed to the potentiometer shaft. A flexible cable 353, wound around the drum 352 intermediate its ends, has one end attached to the dynamotor housing 338 and has its other end attached to a tension spring 353 which is in turn attached to the base 340. Rotation of the dynamotor housing 338, then, produces corresponding rotation of the potentiometer shaft to produce a voltage signal responsive to the position of the arm 343. This signal is used to determine whether or not the arm is positioned within an acceptable angular range above or below the horizontal.

FIG. 19 is a functional block diagram of the torque transducer and associated apparatus in combination with a computer, wherein the calibration of the transducer and the measurements of angular velocity and torque are made by the computer in response to inputs from the dynamotor and magnetic pick-off devices. For the calibration procedure to be described, a computer 355 computes and controls the application of electric loads to the dynamotor 336 through a dynamotor load control 356. Varying incremental electric loads are applied to the dynamotor to balance the standard load applied to the housing 338 through the torque arm 343 and the weight 344; and this load is balanced when the arm 343 is horizontal. Input signals from the potentiometer 350 are fed to the computer through the potentiometer-to-digital converter 354 responsive to the position of the torque arm 343; and from this information the computer calculates the increase or decrease in load to be applied through the load control 356. The RPM pick-off device 324 and the torque pick-up device 334 control the starting and stopping of the RPM and the torque counters in accordance with the computer program.

The operation of the torque measuring system and the method for calibrating the system and for making torque measurements will now be described with reference to the flow charts of FIGS. 20, 21, and 22. While the counters which are referred to for making the above mentioned "velocity count" and "displacement count" may be external counters, it is assumed for the present description that these are internal counters within the computer.

Prior to the beginning of the calibration procedure, certain known or precalculated information is stored in the computer memory. The no-load RPM, while it may be calculated by the apparatus, is preferably predetermined by other apparatus for greater accuracy and this value, referred to as "RPM 31," is stored in the computer memory. The potentiometer output value or range of values for the acceptable position of the torque arm 343, above and below the horizontal, is stored in the computer memory for use during the calibration procedure. The standard torque load applied to the dynamotor housing 338, as determined by the effective length of the torque arm 343 and the weight 344, is stored in the computer memory for use during the computation and the unknown torque load. The standard torque load is referred to as "TQ 32."

FIG. 20 is a flow chart for the calibration procedure; and FIG. 21 is a sub-routine identified as "Read RPM and Torque" in the flow charts of FIGS. 20 and 22.

To begin the calibration procedure, values for RPM and shaft displacement are taken with no load applied to the dynamotor; and accordingly the dynamotor load control 356 is set for no load by the computer (Diagram 360). This sets up a first condition of "known load" which is actually "zero load" and which is referred to as "TQ 31"; and accordingly the external torque load which is applied to the dynamotor frame 338 by the torque arm 343 and weight 344 rotates the frame in a counter clockwise direction as viewed in FIG. 18 wherein the torque arm engages the limit arm 347 of the bracket 345. The computer then programs the read RPM and torque count sub routine (Diagram 361) according to the flow chart of FIG. 21.

For this sub-routine, first the RPM counter, which measures the velocity count determined by magnets W and V, and the torque counter which measures the "displacement count" as determined by the magnets V and T, are set to zero (Diagram 374). When the magnet W is sensed by its associated magnetic pick-off device 324, the RPM counter is started; and when the magnet V is sensed by the pick-off device, the RPM counter is stopped. The RPM count is then held in the RPM counter (Diagrams 375 to 378). When the magnet V is sensed by the pick-off device 324, the torque counter is started; and when the magnet T is sensed by its associated pick-off device 334, the counter is stopped. This counter then retains a time count which is a function of torque bar angular displacement (Diagrams 378–380).

At the completion of the sub-routine a value for RPM count, referred to as RV 31, is stored in the computer memory, this value RV 31 being a function of the no load velocity "RPM 31" (Diagram 362). A value TV 31 for the torque count is also stored in the computer memory, this value TV 31 being a function of the displacement count at no load. This displacement at no load results from the initial placement of the RPM disc 320 and the torque disk 330 on the transducer shaft assembly, and also results from residual torque load resulting from bearing friction, etc.

The computer then programs the procedure for reading and storing RPM and torque data values for a second condition of known load, that is when the known standard load TQ 32 determined by the arm 343 and weight 344 is balanced by an electric load applied to the dynamotor. The computer programs an incremental load increase through the dynamotor load control 356 (Diagram 364) and a "level counter" is set to zero (Diagram 365). This level counter, which may also be an internal counter, is provided to ascertain that the torque arm 343 remains within the acceptable balance range for a predetermined time before the data values for RPM and torque are stored in the computer memory. The RPM and torque count sub routine is then repeated (Diagram 366) so that the counts for velocity and displacement are retained in the respective counters. Through the input information from the potentiometer 350, the computer determines whether the torque arm has reached the level (acceptable range) position or whether the arm has exceeded the level position and is too high (Diagrams 367 and 368). If the arm has not yet reached the level position and is not too high, the computer programs another incremental load increase (Diagram 364) and the procedure is repeated. If the torque arm is too high, the computer programs an incremental load of decrease (Diagram 371) and the procedure is repeated including setting the level counter to zero. The procedure is repeated as necessary with incremental increasing or decreasing loads applied until the computer determines from the potentiometer reading that the torque arm is level (Diagram 367). At this point, one count is added to the level counter (Diagram 370) and the procedure is repeated omitting the step of setting the level counter to zero (Diagram 365). This procedure is repeated one hundred times until the level counter reads 100 with the torque arm remaining within the level range (Diagram 369). When the level counter reaches 100 velocity value RB 32, which is a function of the RPM at the standard load condition, is stored in the computer memory Diagram 372); and torque value TV 32, which is a function of the torque bar displacement of the standard load condition corrected to known load RPM, is stored in the computer memory (Diagram 373). The values TV 32 and TV 31 then represent an angular deflection of the torque bar which is a function of the known torque load TQ 32 and which determines a ratio of angular deflection to torque load.

FIG. 22 is a flow chart concerned with measuring RPM and torque values and computing an unknown torque load when the transducer 300 is coupled to apparatus for the purpose of measuring or monitoring the torque load on the apparatus. This procedure is applicable to a transducer which has been calibrated in the above described manner. To begin this procedure, the computer programs the "Read RPM and Torque Count" sub routine (Diagram 384) as set out in FIG. 21. Then the value for the RPM "RV 33" at the unknown load is stored in the computer memory (Diagram 385); and the data value for the torque displacement at the unknown load "TV 33" is stored in the computer memory (Diagram 386). The computer then calculates the angular velocity at the unknown load from the values RPM 31, RV 31, and RV 33 (Diagram 387); and the computer computes the torque "TQ 33" for the unknown load from the torque values TV 33 and TV 31 and the standard torque load TQ 32. If desired, the computer could also make a horsepower calculation from the information stored in its memory.

The above described method and apparatus would have particular application in situations where it is desired to continuously or periodically monitor the torque load on machinery or apparatus. One example is the monitoring of the torque load on an inclined conveyor belt to determine whether or not the belt is overloaded or underloaded, with the information possibly being used to control the flow of material onto the belt. The monitoring of the torque load may also be used as a means for calculating the amount of material conveyed over a given time period. Another application of the system is the determining of the tension on a webb, such as during the manufacturing of aluminum foil for example. Another monitoring application is that of measuring the torque load on a compressor for the purpose of shutting down the unit before the unit is damaged due to overload. Another application would be that of testing the torque output of electric motors.

A particular advantage of the apparatus and method is that the calibration of the torque bar may be rechecked any time if it is believed that the calibration is no longer valid, as, for example, would occur if the torque bar should be twisted beyond its elastic limit. Upon checking the calibration, the deflection can be checked again at the standard load; and if the torque value is the same, the calibration remains valid. If the original calibration is no longer valid, the transducer may be recalibrated for additional torque measuring uses.

From the foregoing, it can readily be seen that the present invention provides greatly improved methods and apparatus for measurement of physical phenomena. In view of the foregoing description, the principles of the present invention can readily be extended by those skilled in the art to measurement of phenomena other than those specifically disclosed herein. Thus, although the invention has been described with reference to particular preferred embodiments thereof, many changes and modifications will become readily apparent to those skilled in the art in view of the foregoing description which is intended to be illustrative and not limiting of the invention defined in the appended claims.

What is claimed is:

1. A method of providing data from which measured values of physical phenomena can be mathematically determined using a curve fitting technique that comprises the steps of:
   establishing $n+1$ conditions in a measurement apparatus in response to physical phenomena having $n+1$ known values;
   establishing a certain condition in the measurement apparatus in response to a physical phenomenon having an unknown value;
   said measurement apparatus generating relative data values which are a function of the conditions present in said apparatus;
   storing relative data values in a memory each time a condition is established; and
   utilizing said $n+1$ known values of said physical phenomena and said unknown value of said physical phenomenon as one coordinate of different points on a curve of $n$ degree, and utilizing the respective stored relative data values as the other coordinate of each of said points.

2. A method as set forth in claim 1 including the steps:
   storing in the memory said known values of said physical phenomena;
   and computing from said stored values and relative data values the unknown value for said physical phenomenon in response to which said certain condition was established in the measurement apparatus.

3. A method as set forth in claim 1
   wherein two conditions are established in the measurement apparatus in response to physical phenomena having two known values;
   and wherein said two known values and said unknown values are each one coordinate of different points on a first degree curve.

4. A method as set forth in claim 1 including the steps:
   providing a measurement apparatus which is responsive to the physical phenomenon to be measured;
   providing actuator means for said measurement apparatus for establishing in said apparatus the different conditions in response to the phenomena;
   providing sensor means for said apparatus whose output is the relative data values which are functions of the conditions present in the apparatus.

5. A method as set forth in claim 4 including the step:
   providing a programming means for controlling said actuator means in response to the outputs from said sensor means.

6. A method as set forth in claim 4
   wherein said measurement device provided is a U-tube mercury manometer for the measurement of gas pressures; and wherein said sensor means provided is a conductive probe coacting with the liquid mercury in said manometer, and whose output is relative data values which are functions of the height of the liquid mercury in the manometer.

7. A method as set forth in claim 6
   wherein said sensor means provided further includes a conductive probe having a dielectric coating, to define with the mercury liquid a variable capacitor whose output is a function of the height of the mercury.

8. A method as set forth in claim 4
   wherein the measurement device includes a torsion bar for connection with driving and driven member and which deflects rotationally in response to a torque load; wherein the sensing means provided includes a pair of signal producing means mounted for rotation respectively with the driving and driven ends of the torsion bar, signal detection means for detecting signals from the respective signal producing means, and counter means controlled by said signal detecting means for producing a time value which is the function of the deflection torsion bar.

9. A method as set forth in claim 8
   wherein said actuator means provided includes a dynamometer for establishing selected known torque loads at the driven end of said torsion bar.

10. A method as set forth in claim 4
    wherein said measurement device provided includes a torsion bar for coupling between driving and driven devices and which deflects rotationally in response to the applied torque load;
    wherein said sensor means includes a magnet mounted at each end of the torsion bar for rotation therewith in a path spaced from the axis of rotation, a detector mounted adjacent to the path of each of said magnets for detecting the magnetic field of each path of the magnet, and counter means for producing a time count between the passage of said magnet means which is the data value responsive to the deflection of said torsion bar.

11. A method as set forth in claim 4
    wherein said measurement apparatus provided comprises a temperature detecting head including two materials of known ice point, and a thermal responsive device for producing output signals responsive to the temperature of said detecting head;
    wherein said actuator means provided includes means for heating said head above the temperature of the highest ice point;
    wherein said known physical conditions are established by heating said head to a temperature above the highest ice point, and detecting the thermal responsive device output as a function of time to identify the relative data values which are a function of the respective ice point temperatures;
    and wherein said sensor means comprises said thermal responsive device.

12. A method as set forth in claim 4 wherein said measurement device provided comprises a float supported in a liquid pool and defining with the liquid surface a variable volume chamber, and including means for communicating said chamber with sources of gas for the measurement of gas pressures; and wherein said sensor means provided comprises means for detecting the height of the float under different conditions of pressure, the height of the float being a function of the pressure within the chamber.

13. A method as set forth in claim 4 wherein said measurement device provided comprises a float of known weight supported in a liquid pool and having an open bottom ballast chamber and an open bottom pressure chamber of known cross-section in communication with the liquid; and wherein said sensor means provided comprises means for detecting the height of the float, the height being a function of the pressure within the pressure chamber;

including the further steps: independently supporting said float by communicating said pressure chamber with air at known atmospheric pressure, and detecting the float height as a first data value which is a function of atmospheric pressure; trapping the atmospheric air in the pressure chamber to support the known weight of the float, and detecting the float height as a second data value which is a function of the second known pressure; said atmospheric and second known pressures and said first and second data values determining a ratio of pressure change to data value change; trapping a pocket of air in said ballast chamber to support said float while communicating said pressure chamber with atmospheric air, and detecting the float height as the third data value which is also a function of atmospheric pressure; trapping the air contained within the ballast chamber to retain the extant volume of liquid within said ballast chamber; communicating said pressure chamber with an unknown gas pressure while maintaining said trapped air pocket in said ballast chamber, and detecting the float height as a fourth data value which is a function of said unknown pressure; the difference between said third and fourth data values multiplied by said ratio determining a difference between atmospheric pressure and said unknown pressure.

14. A method as set forth in claim 1 for providing data from which measured values of torque can be mathematically determined, including the steps:

establishing by means of a dynamometer two known torque loads in a driven torsion bar; measuring the angular deflection of said torsion bar by detecting the time different between signals produced by signal devices mounted in axially spaced relation on said torsion bar, said time differences being functions of the respective torque load; storing said time differences as relative data values of the known torque loads;

detecting and storing the angular deflection which is a function of an unknown torque load in the same manner.

15. A method as set forth in claim 1 for providing data from which measured values of temperature can be mathematically determined including the steps establishing two conditions responsive to known temperature phenomena in a measurement apparatus comprising a temperature detecting probe including a thermal responsive device and two materials having different known ice points;

producing relative data values which are functions of the two known ice points by heating said probe to a temperature above that of the highest ice point, and monitoring the thermal responsive device output as a function of time while the probe cools to a temperature below that of the lowest ice point whereby the thermal responsive device output values corresponding to the respective known ice points are detected.

16. A method as set forth in claim 15 wherein the thermister output values for the respective ice points are detected by calculating output value changes for successive discrete increments of time; and comparing succeeding incremental changes with preceeding incremental changes to detect a change in the cooling rate which is a function of the changing condition of one of said materials.

17. A method as set forth in claim 1 for providing data from which measured values of gas pressure can be mathematically determined, including the steps:

establishing two conditions responsive to pressure phenomena in a U-tube mercury manometer, which pressure phenomena are known from the observed relative height of the mercury in the manometer legs;

producing relative data values which are functions of the mercury height, by means of one or more conductive probes in the manometer legs which coact with the conductive mercury and an electric circuit to produce an output signal responsive to the mercury height;

and storing relative data values produced by means of said conductive probe each time a condition is established in the manometer.

18. A method as set forth in claim 1 for providing data from which measured values of gas pressure can be mathematically determined, including the steps:

establishing two conditions of known pressure in a variable chamber defined by a floating chamber means and its supporting liquid surface;

and producing relative data value which are functions of the height of said chamber means relative to the liquid surface.

19. A method as set forth in claim 18 wherein a first known pressure condition is established by communicating said chamber with atmospheric pressure while independently supporting said float in said liquid pool; and wherein a second known pressure condition is established in said chamber when said chamber means of known weight is supported in said liquid pool by the volume of air trapped in said chamber to establish said first condition.

20. A method for mathematically determining measured values of physical phenomena using curve fitting techniques comprising the steps:

establishing $n+1$ known physical conditions inherent in a measurement apparatus which is responsive to the physical phenomenon to be measured and the output of which is relative data values which are a function of a condition present;

storing values in a memory for each of said known physical conditions;

establishing an unknown physical condition inherent in the measurement apparatus;

storing relative data values in a memory each time a known or unknown physical condition is established;

and computing from the values and the data values stored in the memory a value for the unknown physical condition established in the apparatus; said values for said $n+1$ known physical conditions and said unknown physical conditions each being one coordinate of different points on a curve of n degree; the other coordinates of each of said points being the respective stored relative data values.

21. In a system including a computer having a memory and having programming means for directing sequential operations, a measurement apparatus which is responsive to physical phenomena to be measured, actuator means for the measurement apparatus, controlled by the computer, for establishing in the apparatus different conditions of the phenomena to be measured, sensor means for the measurement apparatus, the output of which is relative data values which are functions of conditions present in the apparatus, a method for mathematically determining measured values of physical phenomena using curve fitting techniques comprising the steps:

operating said actuator means to establish a first known condition of the phenomenon in the measurement apparatus;

storing a value for said first known condition in the computer memory, storing a relative data value in the computer memory which is a function of said first known condition;

operating said actuator means in response to the computer output to establish a second known condition of the phenomenon in the measurement apparatus;

storing a value in the computer memory for said second known condition, and storing a relative data value in the computer memory which is a function of said second known condition;

operating said actuator means for establishing an unknown condition of the phenomenon in the measurement apparatus;

storing a relative data value in the memory of the computer which is a function of said unknown condition;

and computing the measured value of said unknown condition; the values of said known and unknown conditions of said phenomenon each being one coordinate of different points on a curve, and said respective data values each being the other coordinate of the different points on said curve.

22. Apparatus for measurement of physical phenomena for use with a computer having a memory, processing means and control means comprising:

a measurement device responsive to a physical phenomenon to be measured;

sensor means for said measurement device whose output is relative data values which are functions of conditions present in the measurement device and which may be stored in the computer memory;

actuator means for said measurement device, operable in response to signals produced by the computer, for establishing in the measurement device different known and unknown conditions of the phenomenon to be measured; and a computer having a memory, processing means, and control means;

said memory providing for the storing of values for said known conditions, and for the storing of relative data values for said known and unknown conditions;

said computer producing said signals for controlling said actuator means;

and said processing means calculating the measured values of unknown conditions established in the measurement device from said stored values and relative data values using curve fitting techniques.

23. Apparatus as set forth in claim 22 wherein said measurement device comprises a U-tube mercury manometer for measuring gas pressures;

wherein said sensor means comprises a conductive probe mounted in at least one leg of said mercury manometer and provided with a dielectric coating to define, with the mercury liquid, a capacitor for producing an electric data values responsive to the height of the mercury within the leg; and wherein said actuator means comprises a plurality of selectively operable valve means for communicating said manometer with selected known and unknown gas pressures.

24. Apparatus as set forth in claim 23 wherein said sensor means comprises first and second conductive probes mounted respectively in the two legs of said U-tube manometer, each probe having a dielectric coating to define a capacitor with the mercury liquid; said first probe being shaped to define a surface area contacted by the mercury liquid which varies as a sine function during movement of the liquid from one end of the probe to the other; and said second probe being shaped to define a surface area contacted by the mercury liquid which varies as a cosine function during movement of the liquid from one end of the probe to the other.

25. Apparatus as set forth in claim 23 including circuit means for converting the capacitance values produced by said probes to data values acceptable to the computer.

26. Apparatus as set forth in claim 22 for measuring torque wherein said measuring device is an elongated torsion bar adapted to be deflected in response to rotational loads;

wherein said sensor means includes means for detecting angular displacement between axially spaced locations on said torsion bar AS a time period;

and wherein said actuator means includes a dynamometer coupled to the load end of said torsion bar for placing known rotational loads on said torsion bar.

27. Apparatus as set forth in claim 26 wherein said sensor means further includes a pair of disc means mounted for rotation with said torsion bar at axially spaced locations thereon; signal producing means mounted on each of said disc means; a pair of signal detector means mounted with respect to the respective disc means to detect a signal from the respective signal producing means; and counter means controlled by said signal detector means for determining the time period between signals produced by the respective signal producing means.

28. Apparatus as set forth in claim 27 wherein said signal producing means comprise permanent magnets mounted in said disc means; and wherein said signal detecting means includes magnetic pick-off devices mounted to detect the magnetic fields produced by said magnets as they are rotated past the pick-off devices.

29. Apparatus as set forth in claim 22 for measuring temperatures wherein said measuring device comprises a sensor head enclosing, in intimate relation with each other, individual sealed quantities of at least two materials each having a known ice point, a heater element and a thermister;

wherein said sensor means comprises said thermister and circuit means for converting the thermister output to data values responsive to the temperature in said head and acceptable to a computer;

and wherein said actuator means comprises said heater element and a control therefore, for heating the head to a temperature above the highest ice point of said at least two materials.

30. Apparatus as set forth in claim 29 wherein said sensor means further comprises computer means for calculating data value changes in response to time, and for comparing data value changes for successive time periods.

31. Apparatus as set forth in claim 22 for measuring gas pressure wherein said measurement device comprises a container for a pool of liquid; float means, disposed for vertical movement within said container, having an open bottom pressure chamber communicating with the liquid surface and defining a manometer device; and conduit means communicating with said chamber;

wherein said actuator means comprises valve means associated with said conduit means for selectively flowing gas into and out of said chamber;

and wherein said sensor means comprises means for detecting the height of said float means relative to said container.

32. Apparatus as set forth in claim 31 wherein said measurement device float means includes a second open bottom chamber communicating with the liquid surface defining a ballast chamber; and conduit means communicating with said ballast chamber;

and wherein said actuator means further comprises valve means associated with said ballast chamber conduit means, for selectively flowing gas into and out of said ballast chamber to control the liquid column therein.

33. Apparatus as set forth in claim 32 wherein the cross-sectional areas of said pressure chamber and said ballast chamber are uniform throughout the height thereof and are equal to each other.

34. Apparatus as set forth in claim 31 wherein said sensor means further comprises a resolver and linkage means coupling said resolver to said float means, wherein said resolver produces data values responsive to the height of the float means and to the pressure within the pressure chamber.

35. Apparatus as set forth in claim 31 including means for exposing said pool of liquid and said float means to a source of reference pressure; and means communicating said conduit means for both said pressure chamber and said ballast chamber with said source of reference pressure.

* * * * *